US010594023B2

(12) United States Patent
Jeon et al.

(10) Patent No.: US 10,594,023 B2
(45) Date of Patent: Mar. 17, 2020

(54) ELECTRONIC DEVICE INCLUDING CONDUCTIVE MEMBER ELECTRICALLY COUPLED TO OPENING OF BRACKET FOR ADJUSTING RESONANCE GENERATED FROM THE OPENING

(71) Applicant: SAMSUNG ELECTRONICS CO., LTD., Suwon-si, Gyeonggi-do (KR)

(72) Inventors: Jaewoong Jeon, Suwon-si (KR); Jungsik Park, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 16/274,508

(22) Filed: Feb. 13, 2019

(65) Prior Publication Data

US 2019/0252766 A1 Aug. 15, 2019

(30) Foreign Application Priority Data

Feb. 14, 2018 (KR) .................. 10-2018-0018586

(51) Int. Cl.
*H04B 1/3888* (2015.01)
*H01Q 1/24* (2006.01)
(Continued)

(52) U.S. Cl.
CPC .......... *H01Q 1/243* (2013.01); *H04B 1/3888* (2013.01); *H04M 1/0262* (2013.01);
(Continued)

(58) Field of Classification Search
CPC ......... H04W 52/0216; H04W 52/0203; H04W 52/0209; H04W 76/10; H04W 88/02;
(Continued)

(56) References Cited

U.S. PATENT DOCUMENTS 5,929,510 A * 7/1999 Geller .................. H01L 23/66
257/635
8,318,339 B2 11/2012 Sennami et al.
(Continued)

FOREIGN PATENT DOCUMENTS

JP   2008-269954    11/2008
JP   2013-187884     9/2013
(Continued)

OTHER PUBLICATIONS

Search Report and Written Opinion dated May 20, 2019 in counterpart International Patent Application No. PCT/KR2019/001756.

*Primary Examiner* — Jean A Gelin
(74) *Attorney, Agent, or Firm* — Nixon & Vanderhye P.C.

(57) ABSTRACT

According to various embodiments, an electronic device may include a conductive bracket including an opening in at least part of the bracket, a display disposed on one surface of the bracket, a battery disposed on another surface of the bracket to face at least part of the opening, an antenna disposed within a specified range of the bracket and configure to output a signal of a first frequency band, and a conductive member comprising conductive material electrically coupled to the bracket by crossing at least part of the opening, wherein the opening is divided into a plurality of openings, to adjust resonance of a second frequency band of the opening generated by the signal output from the antenna.

20 Claims, 22 Drawing Sheets

(51) Int. Cl.
*H04M 1/02* (2006.01)
*H04B 1/3827* (2015.01)

(52) U.S. Cl.
CPC ....... *H04M 1/0266* (2013.01); *H04M 1/0277* (2013.01); *H04B 1/3833* (2013.01)

(58) Field of Classification Search
CPC ... H04W 88/22; H04B 1/3883; H04B 1/3888; H04M 1/0202; H04M 1/0262; H04M 1/0266; H04M 1/0277
See application file for complete search history.

(56) References Cited

U.S. PATENT DOCUMENTS

| | | | |
|---|---|---|---|
| 8,493,274 B2 | 7/2013 | Raura | |
| 9,854,076 B2 | 12/2017 | Yun | |
| 2004/0105347 A1* | 6/2004 | Fujimori | G04C 3/008 368/293 |
| 2010/0033383 A1* | 2/2010 | Yamamoto | H01Q 1/243 343/702 |
| 2011/0095840 A1 | 4/2011 | Degtyarev et al. | |
| 2011/0255250 A1* | 10/2011 | Dinh | G03B 15/03 361/749 |
| 2013/0069497 A1* | 3/2013 | Choi | G06F 1/1626 312/7.2 |
| 2015/0024810 A1* | 1/2015 | Kwon | H01Q 1/243 455/575.5 |
| 2017/0102493 A1* | 4/2017 | Shivell | G01J 5/24 |
| 2017/0117616 A1* | 4/2017 | Chen | H01Q 1/243 |
| 2017/0133752 A1* | 5/2017 | Choi | H01Q 25/50 |
| 2017/0214132 A1 | 7/2017 | Jeon | |
| 2018/0048052 A1* | 2/2018 | Jin | H01Q 1/243 |

FOREIGN PATENT DOCUMENTS

| | | |
|---|---|---|
| KR | 10-0371847 | 2/2003 |
| KR | 10-2010-0034213 | 4/2010 |
| KR | 10-1324165 | 11/2013 |
| KR | 10-2015-0073392 | 7/2015 |
| KR | 10-2015-0074403 | 7/2015 |
| KR | 10-2017-0009671 | 1/2017 |
| KR | 10-2017-0087084 | 7/2017 |

* cited by examiner

ELECTRONIC DEVICE INCLUDING CONDUCTIVE MEMBER ELECTRICALLY COUPLED TO OPENING OF BRACKET FOR ADJUSTING RESONANCE GENERATED FROM THE OPENING

CROSS-REFERENCE TO RELATED APPLICATION

This application is based on and claims priority under 35 U.S.C. § 119 to Korean Patent Application No. 10-2018-0018586, filed on Feb. 14, 2018, in the Korean Intellectual Property Office, the disclosure of which is incorporated by reference herein in its entirety.

TECHNICAL FIELD

The present disclosure relates generally to an electronic device including a conductive member electrically coupled to an opening to adjust resonance generated from the opening of a bracket.

BACKGROUND

Description of Related Art

Recently, as functional gaps of manufacturers are remarkably narrowed, electronic devices are slimmed to satisfy consumer's need. The electronic devices are developed to enhance its rigidity, design, and slimness.

The electronic device may support various wireless communication services such as Long Term Evolution (LTE), wireless fidelity (Wi-Fi), near field communication (NFC), and Bluetooth. The electronic device may include at least one antenna device for supporting various frequencies of various wireless communication services.

To reinforce the rigidity and to realize a beautiful exterior, the electronic device may use a metallic bracket (e.g., a conductive plate, a housing, or a conductive middle plate). The conductive bracket may use a conductive portion electrically separated by at least one nonconductive portion, as an antenna radiator.

The conductive bracket may include at least one opening (e.g., a slot). The opening may provide not only a mounting space for various electronic parts disposed in the electronic device but also at least part of functions of the electronic parts. The electronic device may include various conductors therein. For example, the conductor may extend from the conductive portion which is used as the antenna to the opening. In this case, currents applied to the conductive portion may induce an image current at the conductive bracket. The image current is induced to the opening through the conductor, to thus cause an unintended parasitic resonance.

SUMMARY

Embodiments of the disclosure address the above-discussed deficiencies by providing an electronic device including a conductive member electrically coupled to an opening to adjust resonance generated from the opening of a bracket.

Another aspect of the present disclosure is to provide an electronic device including a conductive member electrically coupled to an opening to adjust resonance generated from the opening of a bracket which prevents and/or reduces degradation of radiation performance of an antenna disposed near (e.g., within a specified range in which resonance may be induced) at least one opening of a conductive bracket.

According to an example aspect of the present disclosure, an electronic device may include a conductive bracket including an opening in at least part of the bracket, a display disposed on one surface of the bracket, a battery disposed on another surface of the bracket to face at least part of the opening, an antenna disposed within a specified range (e.g., a distance at which the antenna may be affected by parasitic resonance caused by the opening in the bracket) of the bracket and configured to output a signal of a first frequency band, and a conductive member comprising a conductive material electrically coupled to the bracket and crossing at least part of the opening, wherein the opening is divided into a plurality of openings to adjust resonance of a second frequency band of the opening generated by the signal output from the antenna.

According to another example aspect of the present disclosure, a portable communication device may include a housing including a front plate, a rear plate facing away from the front plate, and a side surface substantially surrounding a space between the front plate and the rear plate, at least one antenna disposed in at least part of the housing and/or the space, a display exposed through at least part of the front plate so that the display is visible, at least one wireless communication circuit electrically coupled to the antenna, a bracket including at least one opening disposed in the space and extending from a specified range of the antenna, at least one electronic part mounted in the at least one opening, a conductor disposed between the antenna and the at least one opening, and at least one conductive member comprising a conductive material disposed in at least one electronic component mounted in the at least one opening and configured to divide at least one opening into a plurality of portions.

According to yet another example aspect of the present disclosure, an electronic device may include a battery, a conductive bracket including an opening configured to accommodate swelling of the battery, in at least part of a portion in which the battery is accommodated, a display disposed on a surface of the bracket, an antenna disposed within a specified range of the bracket and configured to output a signal of a first frequency band, and a conductive member comprising a conductive material disposed in at least part of the battery and electrically coupled to the bracket and crossing at least part of the opening, wherein the opening is divided into a plurality of openings to adjust parasitic resonance of a second frequency band from the opening generated by the signal output from the antenna.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

Throughout the drawings, like reference numerals will be understood to refer to like parts, components and structures.

DETAILED DESCRIPTION

Figure 1:
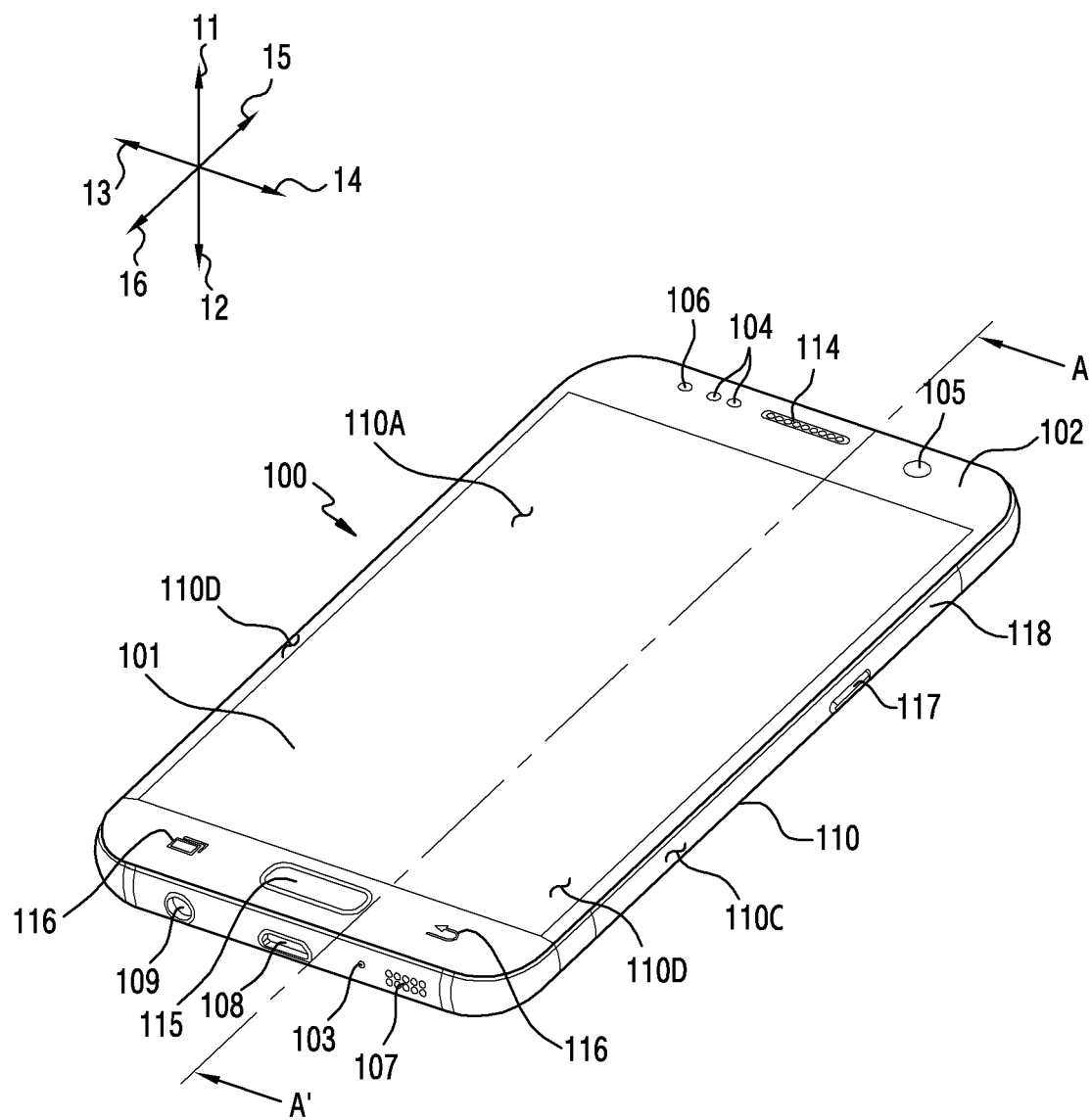
FIG. 1 is a perspective view illustrating a front side of an example mobile electronic device according to various embodiments of the present disclosure.
Figure 2:
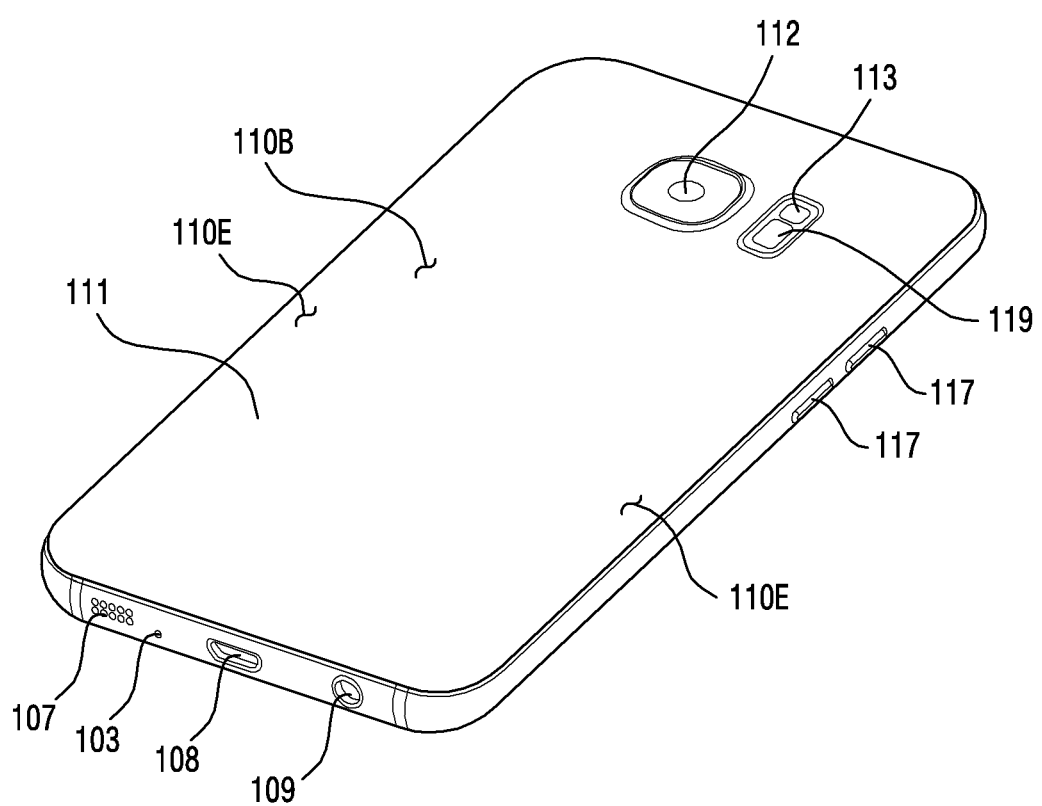
FIG. 2 is a perspective view illustrating a back side of an example electronic device of FIG. 1 according to various embodiments of the present disclosure.

FIG. 1 is a front perspective view illustrating an example mobile electronic device according to various embodiments. FIG. 2 is a rear perspective view illustrating an example mobile electronic device of FIG. 1.

Referring to FIG. 1 and FIG. 2, an electronic device 100 according to an embodiment may include a housing 110 including a first side (or a front side) 110A, a second side (or a rear side) 110B, and a lateral side (surface) 110C surrounding a space between the first side 100A and the second side 110B. In another embodiment (not shown), the housing may refer to a structure which includes part of the first side 110A, second side 110B, and third side 110C of FIG. 1. According to an embodiment, the first side 110A may be constructed of a front plate 102 (or a front cover) (e.g., a polymer plate or a glass plate having various coating layers) which is at least partially transparent. The second side 110B may be constructed of a rear plate 111 (or a rear cover) which may be opaque. For example, the rear plate 111 may be constructed, for example, and without limitation, of coated or colored glass, ceramic, polymer, metallic materials (e.g. aluminum, stainless steel (STS), or magnesium), a combination of at least two of the these materials, or the like. The lateral side 110C (or a side member or side surface) may be constructed of a lateral bezel structure (or a lateral member) 118 bonded to the front plate 102 and the rear plate 111 and including, for example, and without limitation, metal and/or polymer. In some embodiments, the rear plate 111 and the lateral bezel structure 118 may be constructed integrally and may include the same material (e.g., a metallic material such as aluminum).

In the illustrated embodiment, the front plate 102 may include a first region 110D that bends from the first side 110A toward the rear plate and extends seamlessly, at both end of a long edge of the front plate. In the illustrated embodiment (referring FIG. 2), the rear plate 111 may include a second region 110E that extends from the second side 110B toward the front plate and extends seamlessly, at both ends of the long edge. In various example embodiments, the front plate or the rear plate may comprise only one of the first region or the second region. In various example embodiments, the front plate 102 does not include a first region and a second region, and may include only a flat plane disposed in parallel with the second side 110B. In the above embodiments, as viewed from the side of the electronic device, the lateral bezel structure has a first thickness (or width) on the side where the first region or the second region is not included, and a second thickness that is thinner than the first thickness on the side including the first region or the second region.

According to an embodiment, the electronic device 100 may include, for example, and without limitation, at least one or more of a display 101, an input device 103, audio output devices 107, and 114, sensor modules 104, 119, camera modules 105, 112, and 113, and key input devices 115, 116 and 117, an indicator 106, and connector holes 108 and 109. In various example embodiments, the electronic device 100 may omit at least one (e.g., the key input devices 115, 116 and 117 or the indicator 106) of these components or may additionally include other components.

The display 101 may be exposed through, for example, some portions of the front plate 102. In an example embodiment, A portion of the display 101 may be exposed through the front plate 102 forming the first side 110A and the first region 110D of the lateral side 110C. The display 101 may be disposed adjacent to or bonded to, for example, and without limitation, a touch sensing circuit, a pressure sensor capable of measuring touch strength (pressure), and/or a digitizer for detecting a stylus pen of a magnetic field type. In an example embodiment, at least portion of the sensor modules 104, 119 and/or at least portion of the key input devices are disposed on the first portion 110D and/or the second portion 110E.

The input device 103 may include a microphone 103. In an example embodiment, the input device 103 may have a plurality of microphones disposed to sense a sound direction. The audio output device 107 and 114 may include speakers 107, 114. The speakers 107 and 114 may include the external speaker 107 and the communication receiver 114. In some embodiments, the microphone 103, the speakers 107 and 14, and the connectors 108 and 109 may be exposed through at least one hole formed in the housing 110. In an example embodiment, the hole formed in the housing may be used in common for the microphone 103 and the speakers 107 and 114. In an example embodiment, the audio output device 107 and 114 may include the speaker (e.g., a piezo speaker) that is operated except for the holes formed in the housing 110.

The sensor modules 104 and 119 may generate an electrical signal or data value corresponding to an internal operating state of the electronic device 100 or an external environmental state. The sensor modules 104 and 119 may include, for example, the first sensor module 104 (e.g., a proximity sensor) and/or second sensor module (not shown)

(e.g., a fingerprint sensor) disposed to the first side 110A of the housing 110, and/or the third sensor module 119 (e.g., an HRM sensor) disposed to the second side 110B of the housing 110. The fingerprint sensor may be disposed to a portion of the first side 110A (e.g., a home key button 115) or the second side 110B of the housing or below the display 101. The electronic device 100 may further include at least one of a sensor module (not shown), for example, and without limitation, a gesture sensor, a gyro sensor, an atmospheric pressure sensor, a magnetic sensor, an acceleration sensor, a grip sensor, a color sensor, an Infrared (IR) sensor, a biometric sensor, a temperature sensor, a humidity sensor, an illumination sensor 104, or the like.

The camera modules 105, 112, and 113 may include the first camera device 105 disposed to the first side 110A of the electronic device 100, the second camera device 112 disposed to the second side 110B, and/or the flash 113. The camera modules 105 and 112 may include one or more lenses, an image sensor, and/or an image signal processor. The flash 113 may include, for example, and without limitation, a Light Emitting Diode (LED), a xenon lamp, or the like. In some embodiments, two or more lenses (wide angle and telephoto lenses) and image sensors may be disposed to one side of the electronic device 100.

The key input devices 115, 116, and 117 may include the home key button 115 disposed to the first side 110A of the housing 110, the touch pad 116 disposed around the home key button 115, and/or the side key button 117 disposed to the lateral side 110C of the housing 110. In another embodiment, the electronic device 100 may not include some or all of the aforementioned key input devices 115, 116, and 117. The key input devices 115, 116, and 117, which are not included, may be implemented using a soft key displayed on the display 101 or a in a pressure sensor included in the display 101.

The indicator 106 may be disposed to, for example, the first side 110A of the housing 110. The indicator 106 may provide, for example, state information of the electronic device 100 in an optical form and may include an LED (light emitting diode).

The connector holes 108 and 109 may include the first connector hole 108 capable of accommodating a connector (e.g., a USB connector) for transmitting/receiving power and/or data of an external electronic device and/or the second connector hole or earphone jack 109 capable of accommodating a connector for transmitting/receiving an audio signal with respect to the external electronic device.

Figure 3:
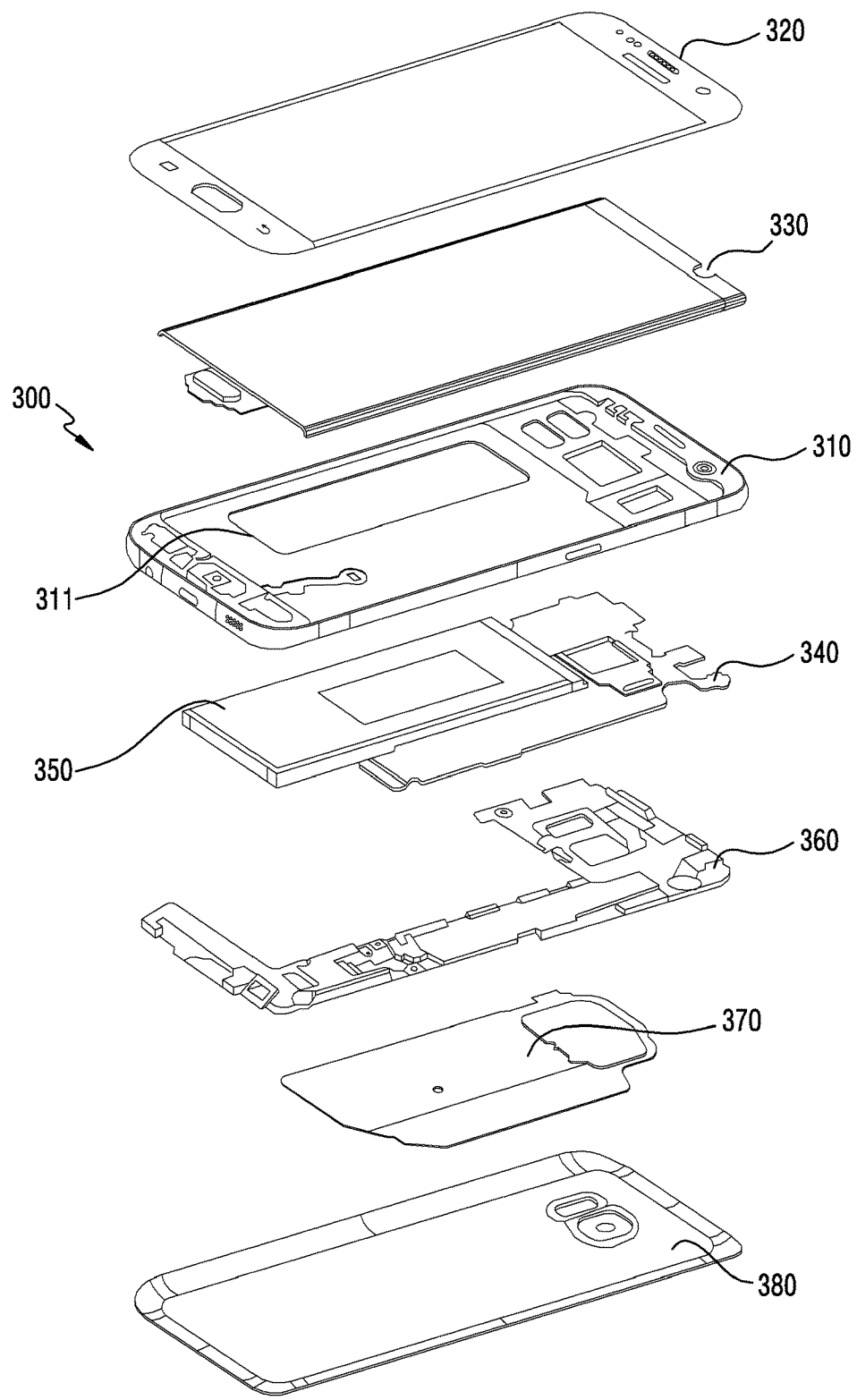
FIG. 3 is an exploded view illustrating an example electronic device of FIG. 1 according to various embodiments of the present disclosure.

FIG. 3 is an exploded perspective view illustrating an example electronic device of FIG. 1 according to various embodiments.

Referring to FIG. 3, an electronic device 300 (e.g., the electronic device (100) of FIG. 1 or FIG. 2) may include a lateral bezel structure 310, a first support member 311 (e.g., a bracket), a front plate 320, a display 330, a printed circuit board 340, a battery 350, a second support member 360 (e.g., a rear case), an antenna 370, and a rear plate 380. In some embodiments, the electronic device 300 may omit at least one (e.g., the first support member 311) of these components, or may additionally include other components. At least one of the components of the electronic device 300 may be the same as or similar to at least one of the components of the electronic device 100 of FIG. 1 or FIG. 2, and redundant descriptions will not be repeated here.

The first support member 311 may be coupled with the lateral bezel structure 310 by being disposed inside the electronic device 300 or may be constructed integrally with respect to the lateral bezel structure 310. The first support member 311 may be constructed of, for example, and without limitation, a metal material and/or non-metal material (e.g., polymer), or the like. The display 330 may be bonded to one side of the first support member 311, and the printed circuit board 340 may be bonded to the other side thereof. A processor, a memory, and/or an interface may be mounted on the printed circuit board 340. The processor may include various processing circuitry, such as, for example, and without limitation, one or more of a central processing unit, an application processor, a graphic processing unit, an image signal processor, a sensor hub processor, a communication processor, or the like.

The memory may include, for example, a volatile memory or a non-volatile memory.

The interface may include, for example, and without limitation, a High Definition Multimedia Interface (HDMI), a Universal Serial Bus (USB) interface, a Secure Digital (SD) card interface, an audio interface, or the like. For example, the interface may electrically or physically couple the electronic device 300 and the external electronic device, and may include a USB connector, an SD card/MMC connector, or an audio connector.

As a device for supplying power to at least one component of the electronic device 300, the battery 350 may include, for example, and without limitation, a non-rechargeable primary cell, a rechargeable secondary cell, a fuel cell, or the like. At least one portion of the battery 350 may be disposed on the same plane substantially with respect to, for example, the printed circuit board 340. The battery 350 may be disposed integrally inside the electronic device 100, or may be detachably disposed with respect to the electronic device 300.

The antenna 370 may be disposed between the rear plate 380 and the battery 350. The antenna 370 may include, for example, and without limitation, a Near Field Communication (NFC) antenna, a wireless charging antenna, a Magnetic Secure Transmission (MST) antenna, or the like. The antenna 370 may perform short-range communication, for example, with the external electronic device, or may wirelessly transmit/receive power required for charging. In another embodiment, an antenna structure may be constructed by at least part of the lateral bezel structure 310 and/or the first support member 311 or a combination thereof.

Figure 4A:
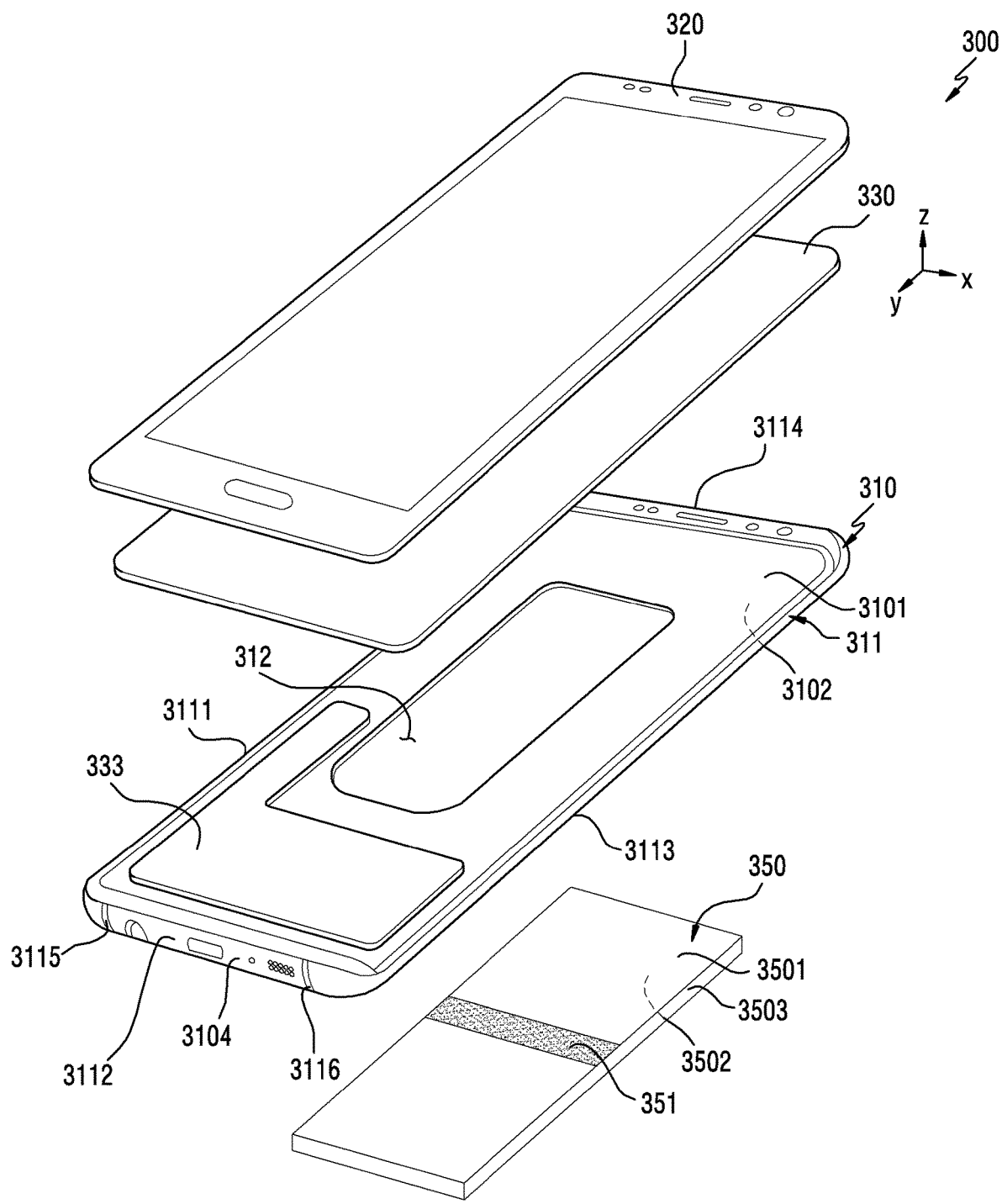
FIG. 4A is an exploded perspective view illustrating an example electronic device where a battery including a conductive member is mounted according to various embodiments of the present disclosure.

FIG. 4A is an exploded perspective view illustrating an example electronic device where a battery including a conductive member is mounted according to various embodiments of the present disclosure.

An electronic device 300 of FIG. 4A may be similar at least in part to the electronic device 101 of FIG. 1, and/or may embrace other embodiments of the electronic device.

Referring to FIG. 4A, the electronic device 300 (e.g., a portable communication device) may include a conductive bracket 310 (e.g., a side bezel structure or a housing). According to an embodiment, the conductive bracket 310 may include a first surface 3101 facing a first direction (e.g., a direction 11 of FIG. 1 or FIG. 2), a second surface 3102 facing an opposite direction (e.g., a direction 12 of FIG. 1 or FIG. 2) of the first direction, and a side member 311 (e.g., a first supporting member) which surrounds a space between the first surface 3101 and the second surface 3102. According to an embodiment, the electronic device 300 may include a display 330 and a front plate 330 sequentially disposed on the first surface 3101 of the conductive bracket 310. According to an embodiment, the electronic device 300 may include a battery 350 disposed on the second surface 3102 of the conductive bracket 310.

According to various embodiments, the side member 311 may include a first side 3111 having a first length, a second side 3112 extending vertically to the first side 3111 and having a second length, a third side 3113 extending from the second side 3112 in the first length in parallel with the first side 3111, and a fourth side 3114 extending from the third side 3113 in the second length in parallel with the second side 3112. According to an embodiment, the second side 3112 may include a unit conductive portion 3104 which is electrically separated by a pair of nonconductive portions 3115 and 3116 (cut-off portions) which are spaced at a specific interval. According to an embodiment, the conductive portion 3104 electrically separated may be electrically coupled to a wireless communication circuit disposed in the electronic device 300 and thus used as an antenna operating in at least one resonance frequency band. According to an embodiment, the fourth side 3114 may be also electrically separated by a pair of nonconductive portions (not shown) which are spaced at a specific interval and used as an antenna radiator.

According to various embodiments, the battery 350 may include a first surface 3501 facing the second surface 3102 of the conductive bracket 310, a second surface 3502 facing away from the first surface 3501, and a side surface 3503 surrounding the first surface 3501 and the second surface 3102. The battery 350 may be formed substantially in a rectangular shape. According to an embodiment, the battery 350 may be disposed at a position corresponding to an opening 312 (e.g., a slot) which is formed in at least part of the conductive bracket 310. According to an embodiment, the opening 312 may be formed in a size for accommodating a swelling portion of the battery 350. According to an embodiment, the battery 350 and a substrate (e.g., the printed circuit board 340 of FIG. 3) may be disposed, but not limited to, in parallel, not to overlap each other. The battery 350 may overlap at least part of the printed circuit board 340.

According to various embodiments, the electronic device 300 may include a conductor 333 as an internal electronic part. The conductor 333 may cause parasitic resonance in response to the conductive portion 3104 which is used as the antenna, wherein an image current flow unintentionally generated from the conductive bracket 310 is disrupted by the opening 312. According to an embodiment, the conductor 333 may include, but is not limited to, a flexible printed circuit board (FPCB) which mounts a display driver IC (DDI) (e.g., a DDI 3331 of FIG. 5A) which is folded back to the display 330 and faces the first surface 3101 of the conductive bracket 310. The conductor 333 may include various electronic parts disposed from vicinity of the conductive portion 3104 to vicinity of the opening 312 inside the electronic device. According to an embodiment, the image current induced from the conductive bracket 310 is induced to the opening 312 through the conductor 333, and thus the corresponding parasitic resonance may degrade radiation performance of the conductive portion 3104 and/or shift an operating frequency band of the conductive portion 3104 to an unwanted band.

According to various embodiments, the battery 350 may include, if mounted on the second surface 3102 of the conductive bracket 310, a conductive member 351 disposed to cross the opening 312. According to an embodiment, the conductive member 351 may be disposed on the first surface 3501 of the battery 350 facing the second surface 3102 of the conductive bracket 310. According to an embodiment, the conductive member 351 may be interposed between the conductive bracket 310 and the battery 350, and may be attached to or spread on an outer surface of the battery 350.

According to an embodiment, the conductive member 351 may be disposed by, but not limited to, attaching a conductive material, e.g., a metal (e.g., Cu) plate, to the first surface 3501 of the battery 350. The conductive member 351 may include conductive paint which is spread on the outer surface of the battery 350. According to an embodiment, the conductive member 351 may divide the opening 312 into at least two divided openings by covering the opening 312 of the conductive bracket 310 and electrically coupling the conductive bracket 310 across the opening 312 with both ends.

According to various embodiments, the opening 312 having the length may be divided by the conductive member 351 which crosses the opening 312, into the at least two divided openings, and the image current induced from the conductive portion 3104 to the opening 312 via the conductor 333 may be shifted to a resonance frequency of a specific band through the electrical lengths of the at least two divided openings. The parasitic resonance frequency of the specific band may be induced by the conductive member 351 to an out-band of an in-band of the conductive portion 3104. Hence, the conductive portion 3104 of the side member 311 avoids interference of the unwanted parasitic resonance of the conductor 333 and the opening 312, thus preventing and/or reducing radiation performance from degrading.

Figure 4B:
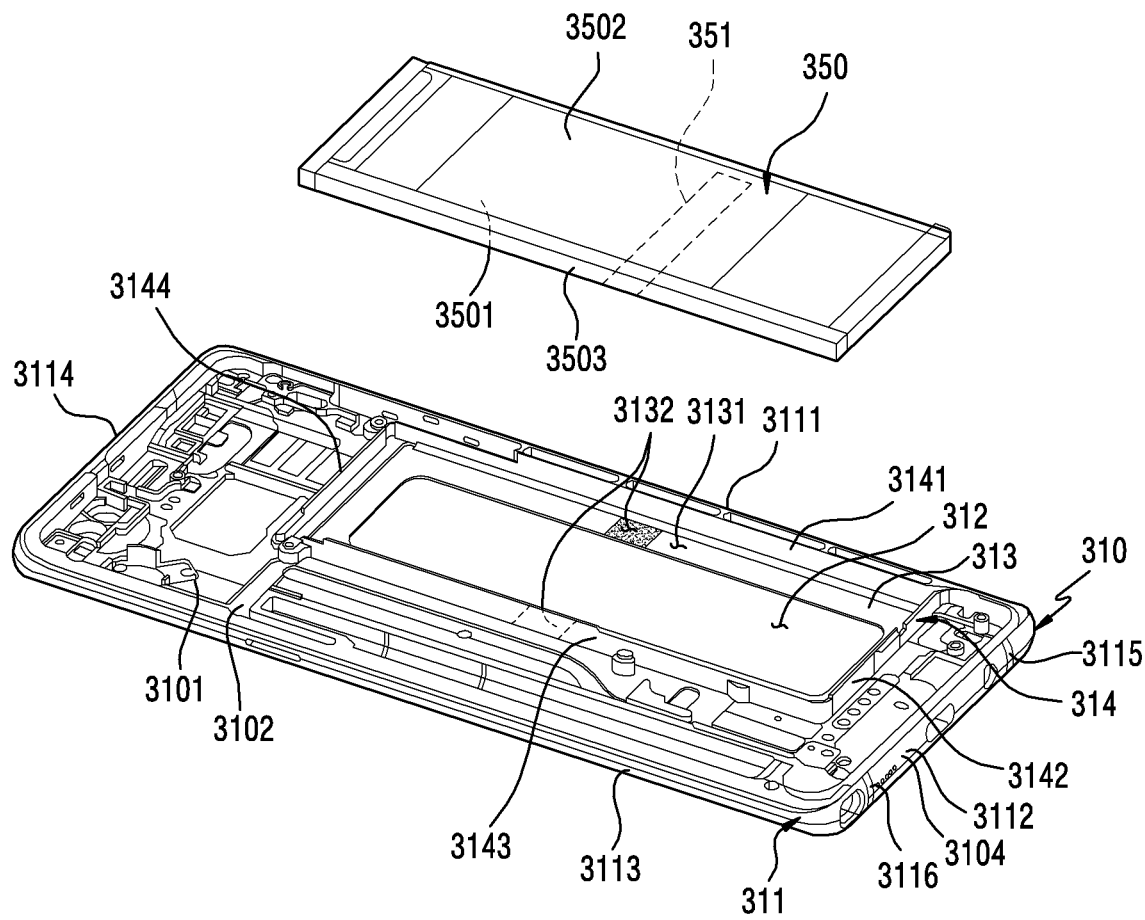
FIG. 4B is an exploded view illustrating an example of a battery mounted in a conductive bracket according to various embodiments of the present disclosure.
Figure 4C:
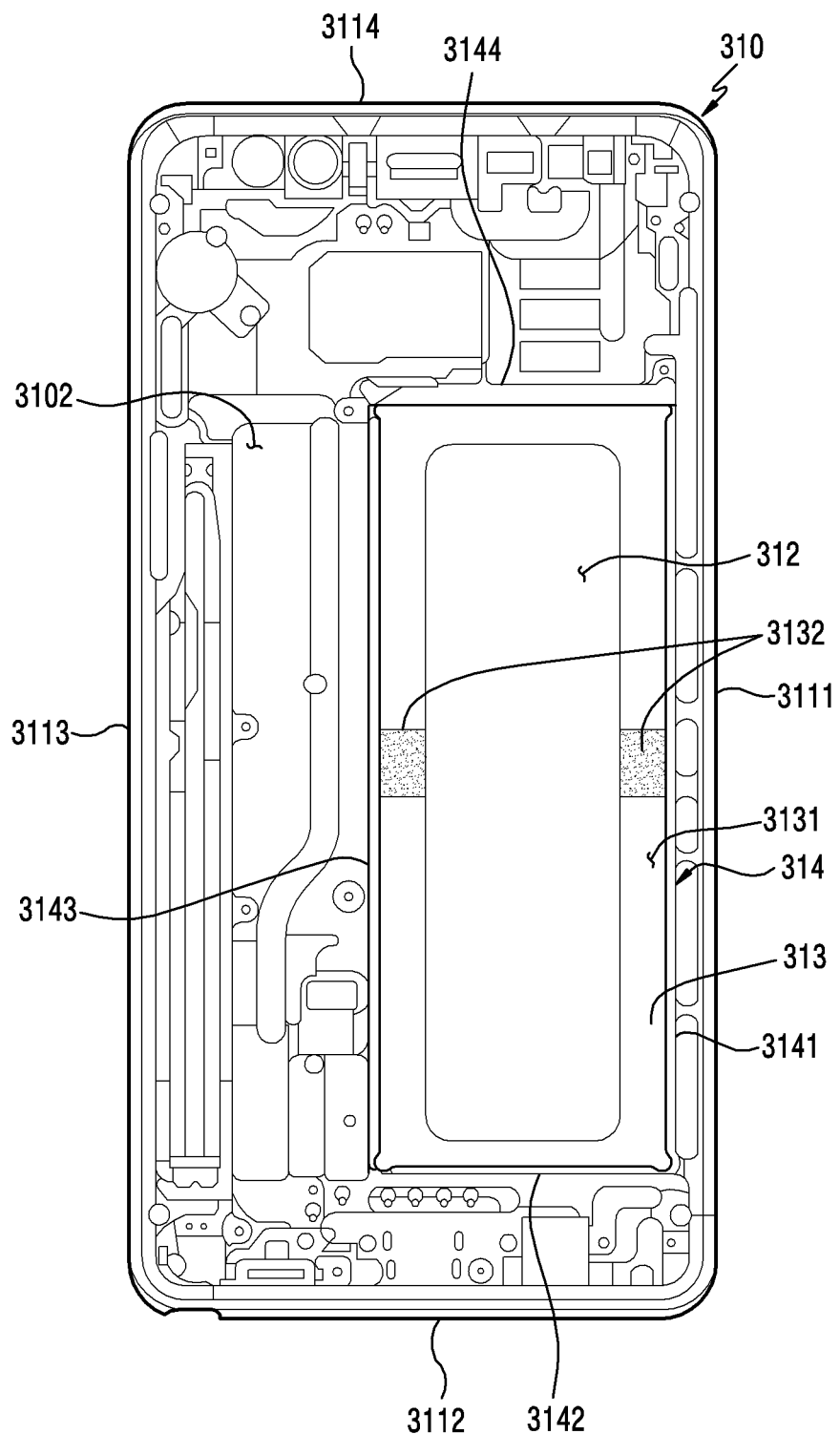
FIG. 4C is a plan view illustrating an example conductive bracket according to various embodiments of the present disclosure.
Figure 4D:
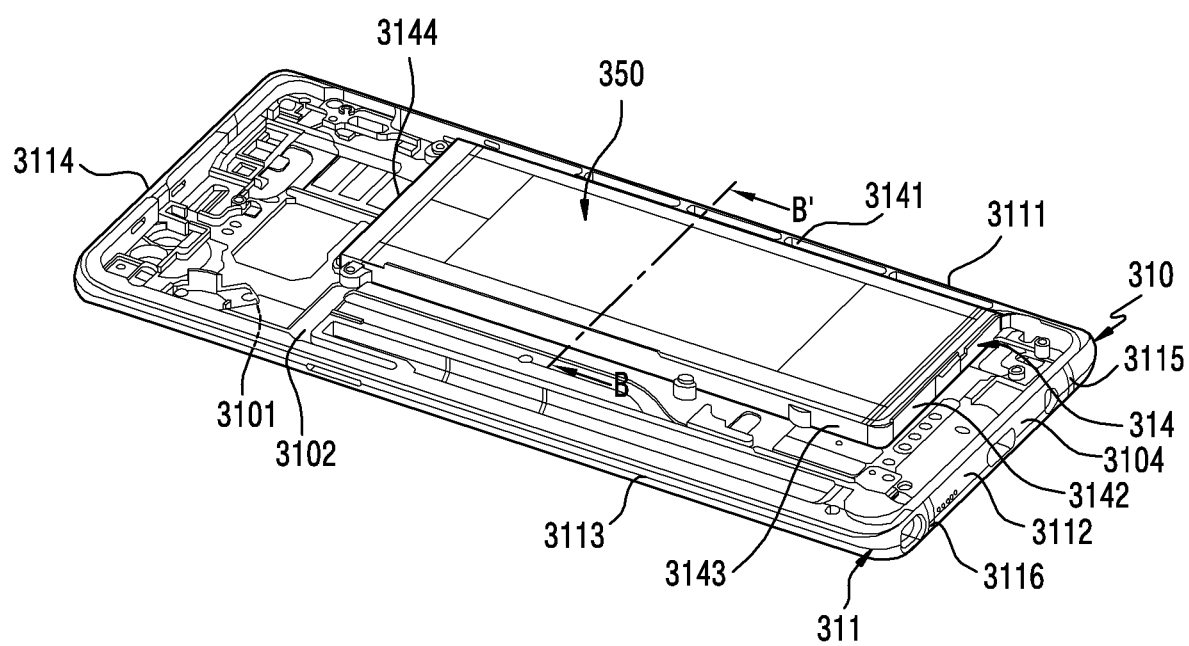
FIG. 4D is a perspective view illustrating an example of a battery mounted in a conductive bracket according to various embodiments of the present disclosure.

FIG. 4B is an exploded view illustrating an example in which a battery is mounted in a conductive bracket according to various embodiments of the present disclosure. FIG. 4C is a plan view illustrating an example of the conductive bracket according to various embodiments of the present disclosure. FIG. 4D is a perspective view illustrating an example in which the battery is mounted in the conductive bracket according to various embodiments of the present disclosure.

Referring to FIGS. 4B, 4C, and 4D, the conductive bracket 310 may include a battery receiver 313 on the second surface 3102. According to an embodiment, the battery receiver 313 includes the opening 312, and may be constructed substantially to receive the battery 350. According to an embodiment, the battery receiver 313 may be defined by a supporting rib 314 which extends from the second surface 3102 of the conductive bracket 310 outwards to a specific height. According to an embodiment, the supporting rib 314 may include a first supporting rib 3141 which extends in the first direction with the first length, a second supporting rib 3142 which extends in the second direction perpendicular to the first direction and has the second length shorter than the first length, a third supporting rib 3143 which extends substantially in parallel with the first supporting rib 3141 and has the first length, and a fourth supporting rib 3144 which extends in parallel with the second supporting rib 3142 and has the second length. According to an embodiment, while the supporting rib 314 determines the battery receiver 313 in the shape for receiving the rectangular battery 350, the supporting rib 314 may be changed by the shape of the battery 350 in various manners. According to an embodiment, the height of the supporting rib 314 may be equal to a thickness of the battery 350, or may be smaller than or greater than the thickness of the battery 350. According to an embodiment, the supporting rib 314 may present the battery 350 received in the battery receiver 313 from moving and contribute to rigidity enhancement of the electronic device 300.

According to various embodiments, the conductive bracket 310 may perform coating (e.g., anodizing, soft feel (SF), or painting), to reinforce the rigidity, to create the beautiful exterior, and/or to prevent corrosion (oxidation).

Since the substantially coated conductive bracket 310 may be electrically disconnected, the contact region of the battery 350 with the conductive member 351 may be excluded from the coating. For example, the battery receiver 313 may include a nonconductive region 3131 which is coated, and a conductive region 3132 which is not coated. According to an embodiment, if the battery 350 is mounted in the battery receiver 313, the conductive member 351 of the battery 350 may physically contact and electrically couple with the conductive region 3132 of the battery receiver 313. While the battery receiver 313 may include a pair of the conductive regions 3132 disposed on the left and the right of the opening 312 as shown in FIG. 4C, any only one side may include the conductive region 3132. According to an embodiment, the conductive region 3132 is formed only in, but not limited to, the battery receiver 313 near the opening 312. For example, if necessary, the conductive region 3132 may extend to an inner side of the supporting rib 314 which contacts a side surface 3503 of the battery 350. In this case, the conductive member 351 is extended to not only the first surface 3501 but also the side surface 3503 of the battery 350, and thus may increase the contacting area with the conductive bracket 310 and improve contact reliability.

Figure 5A:
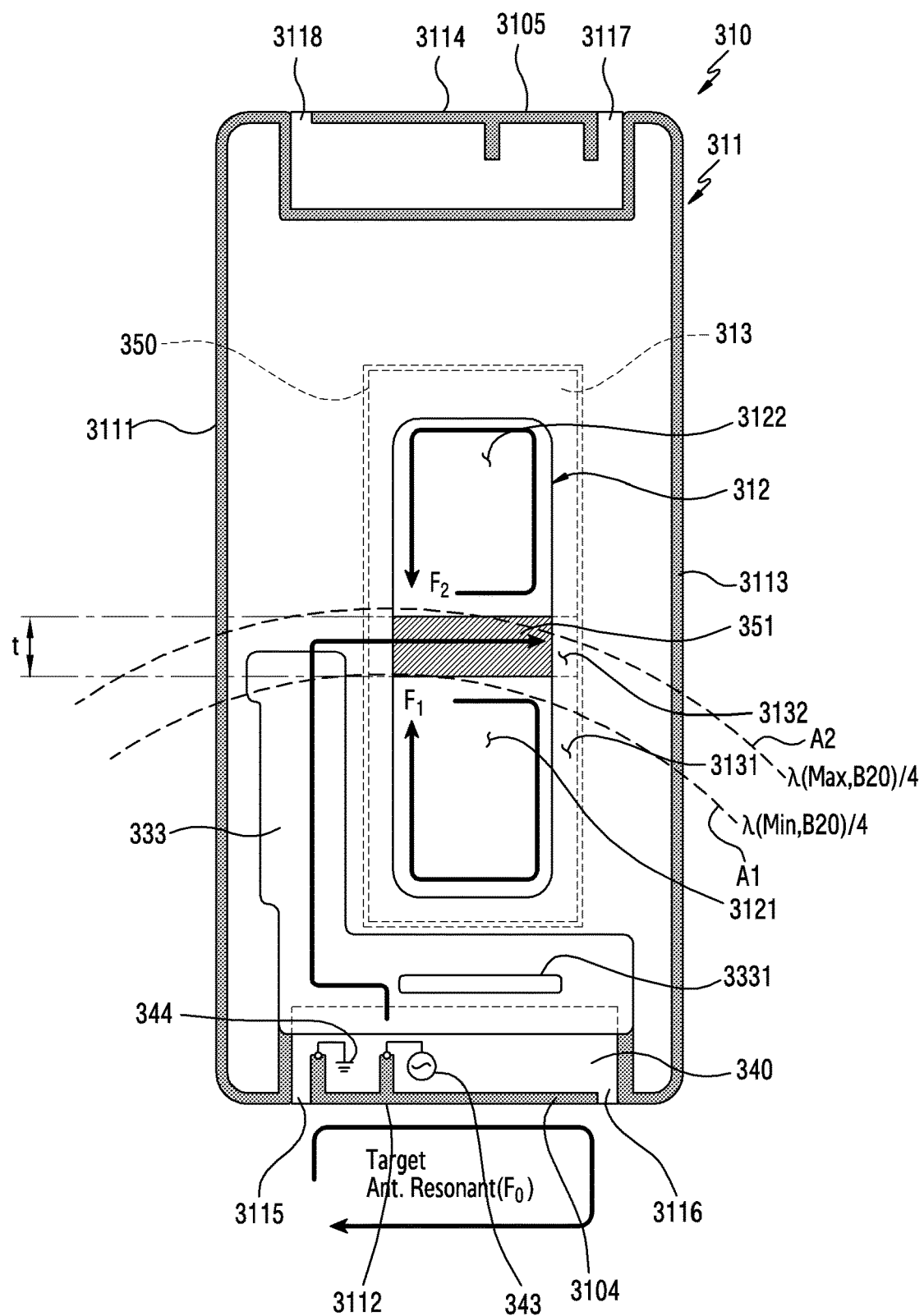
FIG. 5A is a diagram illustrating an example conductive bracket with an opening divided by a conductive member according to various embodiments of the present disclosure.
Figure 5B:
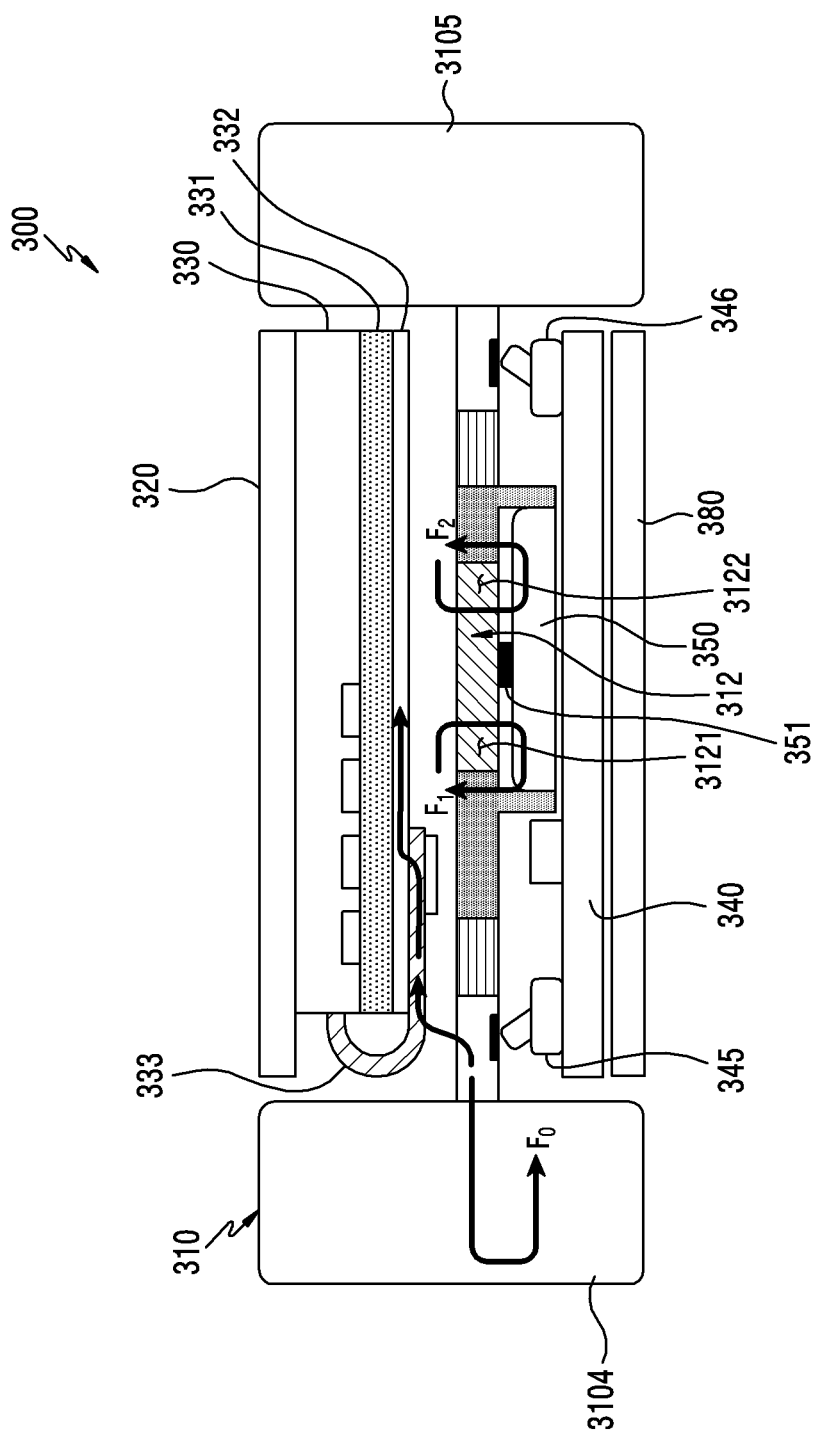
FIG. 5B is a cross-sectional view illustrating an example electronic device, taken along a line A-A' of FIG. 1, according to various embodiments of the present disclosure.

FIG. 5A is a diagram illustrating an example conductive bracket with an opening divided by a conductive member according to various embodiments of the present disclosure. FIG. 5B is a cross-sectional view of an example electronic device, taken along a line A-A' of FIG. 1, according to various embodiments of the present disclosure.

Referring to FIG. 5A and FIG. 5B, the conductive bracket 310 may include at least one functional opening 312 as mentioned above. According to an embodiment, the opening 312 may be formed in a length away from the conductive portion 3104 which is interposed between the pair of the nonconductive portions 3115 and 3116 of the side member 311 of the conductive bracket 310 and used as the antenna. According to an embodiment, the battery 350 may include the conductive member 351 for changing a parasitic resonance frequency band generated from the opening 312. According to an embodiment, the conductive member 351 may cross the opening 312 at right angles to a longitudinal direction of the opening 312. According to an embodiment, the conductive member 351 may be attached to or formed in the battery 351, and the battery 350 may be electrically coupled to the conductive region 3132 of the conductive bracket 310 by merely assembling the battery 350 to the conductive bracket 310.

According to various embodiments, part of the conductive portion 3104 may be electrically coupled to a feeder 343 (e.g., a wireless communication circuit) which is disposed on a printed circuit board 340 (e.g., a PCB) of the electronic device 300 through an electrical coupling member 345 (e.g., a connector or a C-clip), and another part may be electrically coupled a ground 344 (e.g., a ground of the PCB) of the printed circuit board 340, to serve as an antenna for operating in at least one frequency band F0. According to an embodiment, a conductive portion 3105 formed by a pair of nonconductive portions 3117 and 3118 may be electrically coupled to the printed circuit board 340 through an electrical coupling member 346, to serve as an antenna for operating in at least one frequency band.

According to various embodiments, the electronic device 300 may include a display 330, a polymer member 331 (e.g., a buffering member), and a metal plate 332 (e.g., Cu tape) which are sequentially disposed toward the conductive bracket 310 at the back of a front plate 320. According to an embodiment, the conductor 333 may be disposed in the electronic device 300, and include various electronic parts which are disposed from vicinity of the conductive portion 3104 to vicinity of the opening 312 in the electronic device 300, for inducing an image current applied to the conductive portion 3104 to the opening 312 through the conductive bracket 310. For example, remaining radiation component after the radiation of the conductive portion 3104 may be transferred from the conductor 330 through the metal plate 332, and unwanted parasitic resonance may be generated around the opening 312 due to the coupling of the metal plate 332 and the conductive bracket 310. According to an embodiment, the conductor 333 may include an FPCB which is disposed on the back of a metal plate 3320 and mounts a DDI 3331 of the display 330 for folding toward the conductive bracket 310.

According to various embodiments, the opening 312 may be divided into a first divided opening 3121 where a first parasitic resonance frequency F1 is generated from the conductive member 351 of the battery 350 mounted in the conductive bracket 310, and a second divided opening 3122 where a second parasitic resonance frequency F2 is generated. According to an embodiment, the attach position of the conductive member 351 in the conductive bracket 310 may be determined in response to a quarter wave-length range $\lambda/4$ of the conductive portion 3104 which serves as the antenna. According to an embodiment, as the conductive member 351 is electrically coupled to cross the opening 312, the first divided opening 3121 which is the closest to the conductive portion 3104 may be placed in the quarter wave-length range of the conductive portion 3104. Naturally, the second divided opening 3122 is apart from the conductive portion 3104, and the parasitic resonance from the second divided opening 3122 may not be generated or may be induced in the out-band.

According to various embodiments, the conductive member 351 of the battery 350 may be disposed to be electrically coupled with the region of the opening 312 corresponding to the quarter wave-length range $\lambda/4$ of the conductive portion 3104 which is used as the antenna. According to an embodiment, the conductive member 351 may be disposed at right angles to the longitudinal direction of the opening 312 based on the circular quarter wave-length range (lines A1, A2) in the radiation direction from the feeder 343 of the conductive portion 3104. According to an embodiment, a width t of the conductive member 351 may be determined to a resultant value by subtracting a minimum value $\lambda(Min,B20)/4$ (line A1) from a maximum value $\lambda(Max,B20)/4$ (line A2) of the quarter wave-length. According to an embodiment, the attach position of the conductive member 351 may be determined by considering the region on the opening 312.

According to various embodiments, while the conductive member 351 may be attached to various positions of the opening 312, the attach position may be determined wherein a loop length of the first divided opening 3121 and the second divided opening 3122 is shorter than the half wave-length range $\lambda/2$ of the conductive portion 351.

Figure 5C:
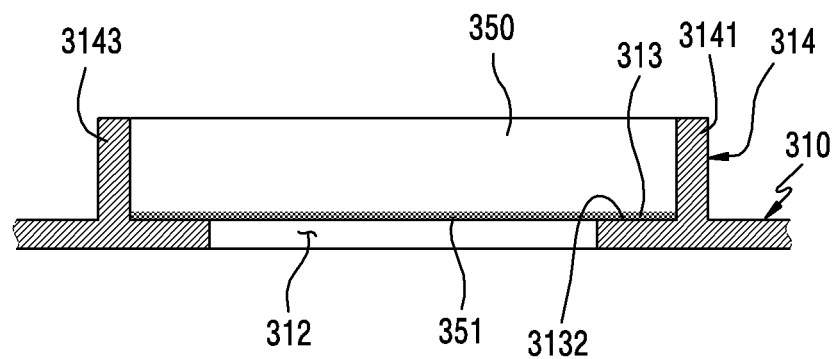
FIGS. 5C, 5D and 5E are cross-sectional views illustrating an example of a battery mounted in a conductive bracket according to various embodiments of the present disclosure.
Figure 5D:
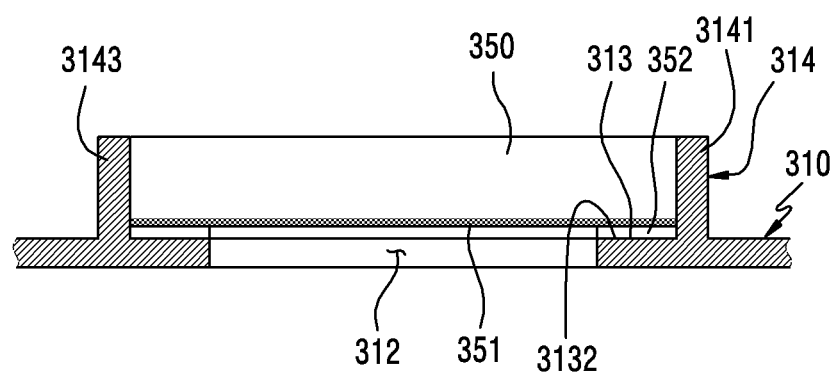
Figure 5E:
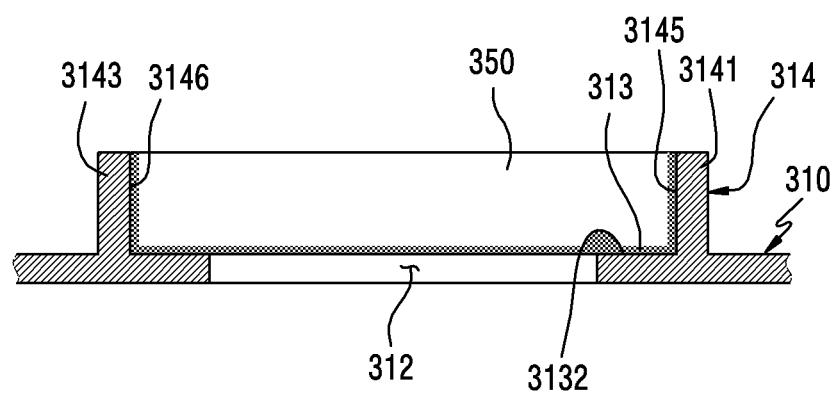

FIGS. 5C, 5D and 5E are cross-sectional views illustrating an example battery mounted in a conductive bracket according to various embodiments of the present disclosure. For example, FIGS. 5C, 5D and 5E are the cross-sectional views taken from the line B-B' of FIG. 4C.

Referring to FIG. 5C, the conductive bracket 310 may include the opening 312. According to an embodiment, the conductive bracket 310 may include the supporting rib 314 for defining the battery receiver 313 which surrounds the opening 312. According to an embodiment, if the battery 350 is mounted in the battery receiver 313, the conductive member 351 of the battery 350 may contact the conductive region 3132 of the battery receiver 313. According to an embodiment, the conductive member 351 may be electrically coupled to the conductive bracket 310 by merely mounting the battery 350 in the battery receiver 313, and thus divide the opening 312 into at least two divided openings.

According to various embodiments, the conductive member 315 may be disposed on the first surface 3501 of the battery 350 to block at least part of the opening 312 of the conductive bracket 310. In this case, the conductive member 315 may block the parasitic resonance by shielding the opening 312 not to contact the battery receiver 313 of the conductive bracket 310.

Referring to FIG. 5D, a conductive medium 352 may be interposed between the conductive region 3132 of the battery receiver 313 of the conductive bracket 310 and the conductive member 351 of the battery 350, to improve the contact reliability. According to an embodiment, the conductive medium 352 may include conductive foam, conductive tape, or a conductive sealing member.

Referring to FIG. 5E, the contacting area may be expanded to improve the contact reliability between the conductive region 3132 of the battery receiver 313 of the conductive bracket 310 and the conductive member 351 of the battery 350. For example, the conductive member 351 may be extended to a side surface (e.g., the side surface 3503 of FIG. 4A) of the battery 350, and accordingly the conductive region may be extended to inner surfaces 3145 and 3146 of the supporting ribs 3141 and 3143 extending near the battery receiver 313.

Figure 6:
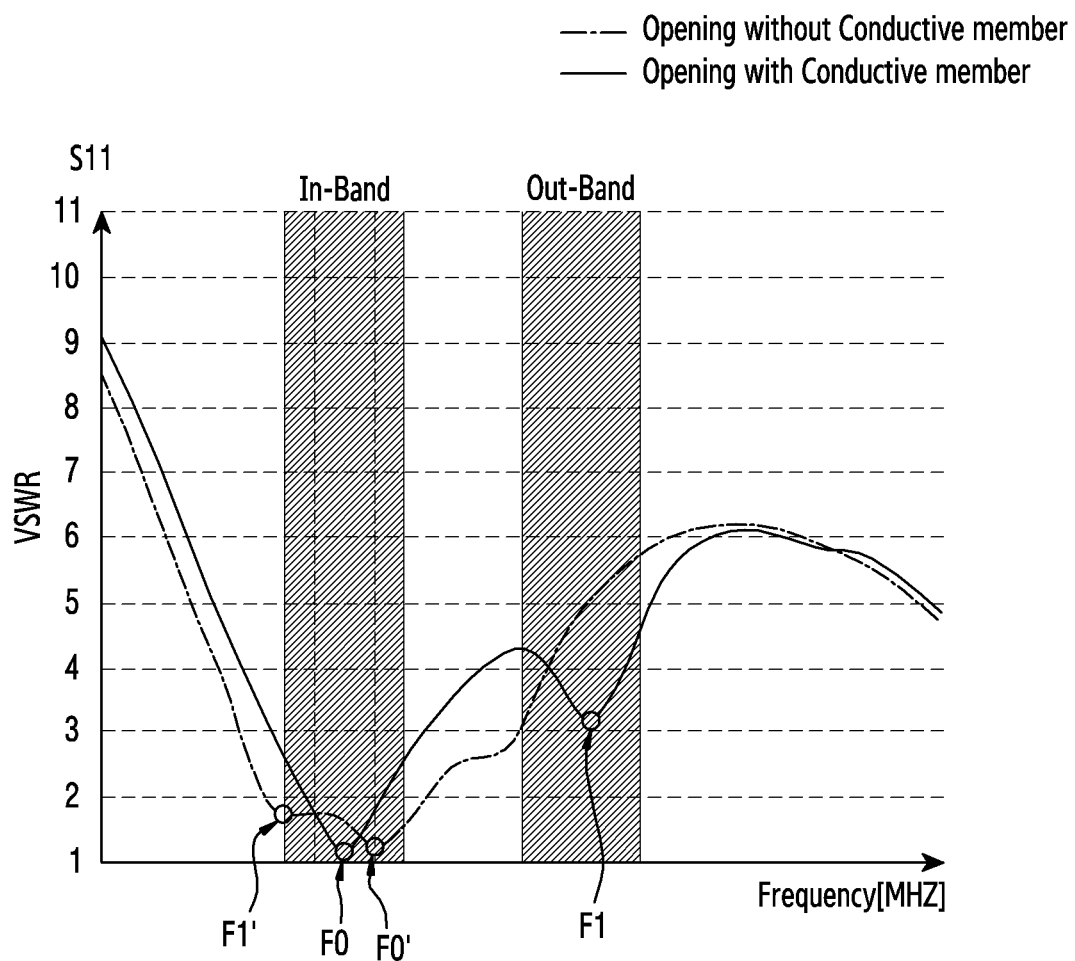
FIG. 6 is diagram illustrating a voltage standing wave ratio (VSWR) graph of an opening with and without a conductive member according to various embodiments of the present disclosure.

FIG. 6 is diagram illustrating a voltage standing wave ratio (VSWR) graph of an opening with or without a conductive member according to various embodiments of the present disclosure.

Referring to FIG. 6, when a conductive portion (e.g., antenna) 3104 is within a range or distance of the opening 312, if a conducive portion (e.g., the conductive portion 3104 of FIG. 5A) operates in the in-band (e.g., B20 band (about 791 MHz~about 862 MHz)) and a conductive member (e.g., the conducive member 351 of FIG. 5A) is not applied to an opening (e.g., the opening 312 of FIG. 5A), a parasitic resonance frequency F1' generates in the in-band and a main resonance frequency F0' of the conductive portion 3104 is shifted to an unwanted frequency band as shown in the graph. As a result, antenna radiation performance of the conductive portion 3104 may be degraded.

According to various embodiments, if a battery (e.g., the battery 350 of FIG. 5A) including the conductive member 313 is mounted in a conductive bracket (e.g., the conductive bracket 310 of FIG. 5A) and the opening 312 is divided, the frequency F0 of the conductive portion 3104 operates in an optimal resonance frequency band and the parasitic resonance frequency F1 is shifted from the in-band to the out-band. Hence, the antenna radiation performance of the conductive portion 3104 may maintain optimal radiation performance, without being interrupted by the parasitic resonance of the opening 312.

In the example embodiments of the present disclosure, the conductive portion 3104 which is used as the antenna is formed as, but not limited to, part of the conductive bracket 310 including the opening 312. For example, at least one antenna may be disposed in a separate region from the conductive bracket 310 in the electronic device, and the example embodiments of the present disclosure may be applied in response to the influence of the parasitic resonance if the image current induced through the conductive bracket 310 is induced (e.g., if the portion used as an antenna is within a specified range of the bracket having an opening that would otherwise induce parasitic resonance) to the opening through the conductor in the electronic device 300.

In the example embodiments of the present disclosure, the opening 312 of the conductive bracket 310 is, but not limited to, the battery swelling hole. For example, if the parasitic resonance generates from at least one opening of an electronic pen slot, a camera mounting hole, various sensor holes, or wiring through holes of the conductive bracket 310, the opening may be divided by applying the conductive member to electronic parts such as an electronic pen, a camera, a sensor module, or wires and thus the parasitic resonance frequency may be shifted to the out-band.

FIGS. 7A, 7B, 7C, 7D, 7E, 7F, 7G and 7H are diagrams illustrating examples of a conductive bracket where an opening is divided in various shapes by a conductive member according to various embodiments of the present disclosure.

A conductive bracket 710 of FIGS. 7A, 7B, 7C, 7D, 7E, 7F, 7G and 7H may be similar at least in part to the conductive bracket 310 of FIG. 4A, and embrace other embodiments of the conductive bracket.

Referring to FIGS. 7A, 7B, 7C, 7D, 7E, 7F, 7G and 7H, the conductive bracket 710 may include a side member 711 (e.g., the side member 311 of FIG. 3). According to an embodiment, the conductive bracket 710 may include an opening 712 (e.g., the opening 312 of FIG. 3) having a length in parallel with a longitudinal direction (e.g., a direction ②) of the electronic device. According to an embodiment, a battery 750 (e.g., the battery 350 of FIG. 3) may be mounted in at least part of the conductive bracket 710, wherein the opening 712 is included in the mounting region, and conductive members 751, 752, 753 and 754 (e.g., the conductive member 351 of FIG. 3) of various shapes in the battery 750 may divide the opening 712 into at least two divided openings in various numbers and shapes or may shield at least part of the opening 712.

Figure 7A:
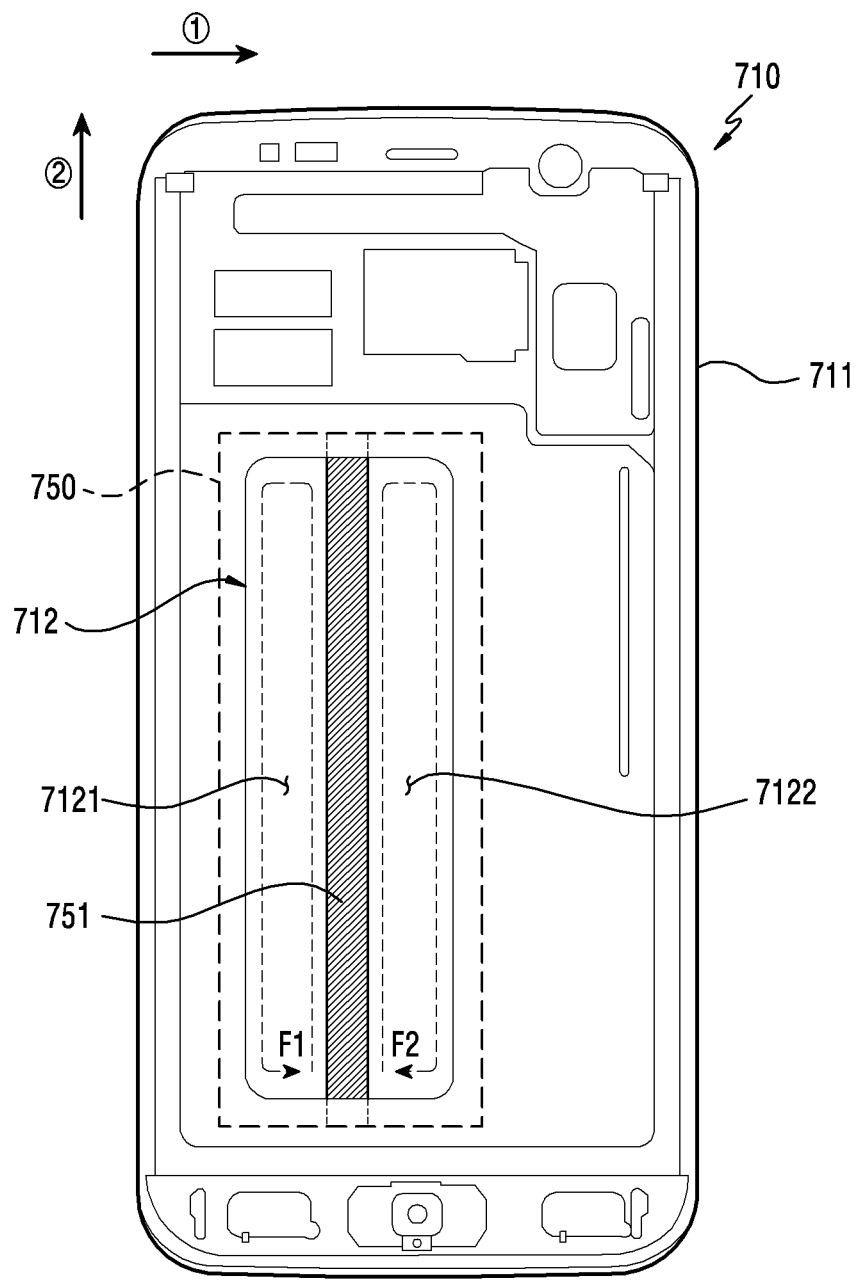
FIGS. 7A, 7B, 7C, 7D, 7E, 7F, 7G and 7H are diagrams illustrating examples of an opening divided by a conductive bracket in various shapes according to various embodiments of the present disclosure.

Referring to FIG. 7A, the opening 712 may be divided by the conductive member 751 disposed in the battery 750, into two divided openings 7121 and 7122. According to an embodiment, the conductive member 751 may cross the longitudinal direction (e.g., the direction ②) of the opening 712 to electrically couple with the conductive bracket 710, and thus divide the opening 712 to the two divided openings. Accordingly, the first divided opening 7121 may have a first parasitic resonance frequency F1, and the second divided opening 7122 may have a second parasitic resonance frequency F2.

Figure 7B:
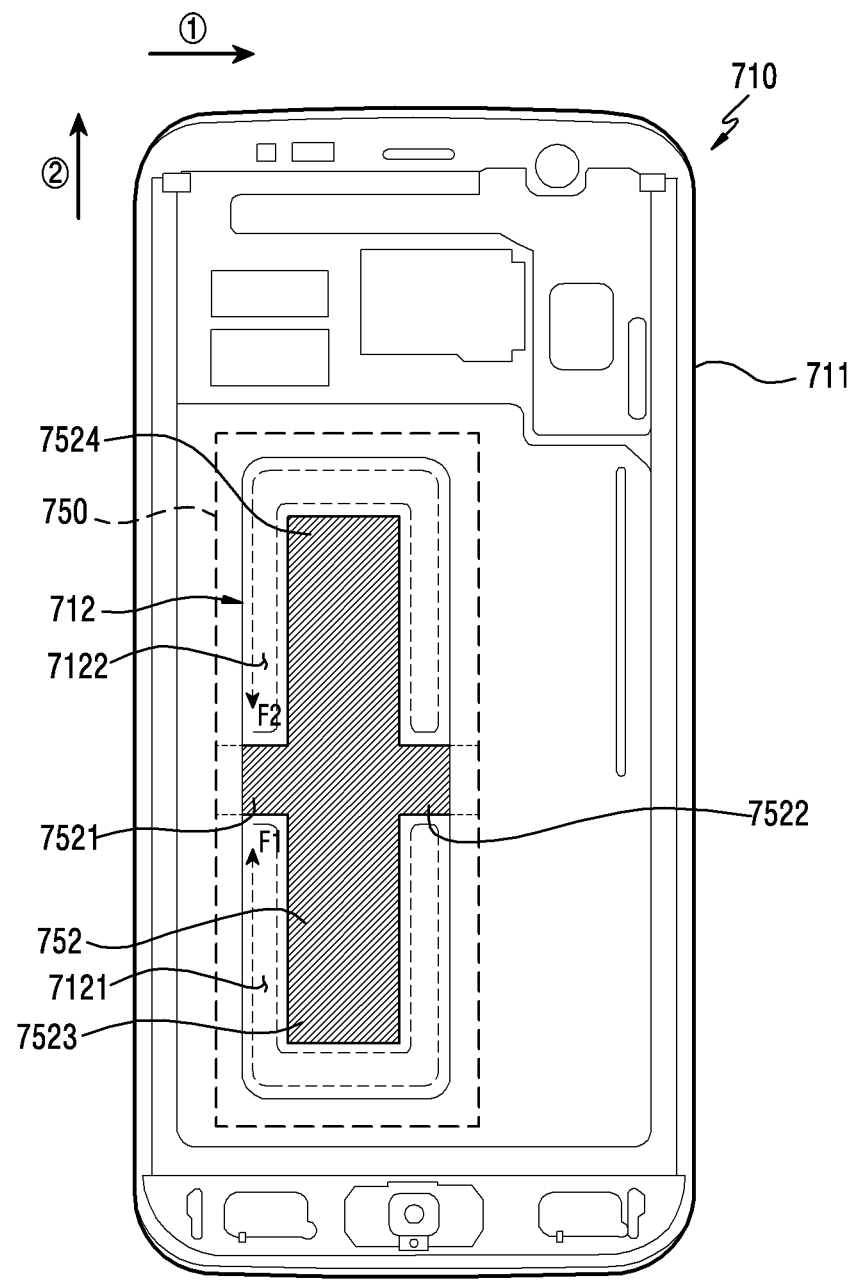

Referring to FIG. 7B, the opening 712 may be divided by a conductive member 752 disposed in the battery 750, into the two divided openings 7121 and 7122. According to an embodiment, the conductive member 752 may cross a transversal direction (e.g., the direction ①) of the opening 712 to electrically couple a first portion 7521 and a second portion 7522 to the conductive bracket 710, and thus divide the opening 712 to the two divided openings. According to an embodiment, the conductive member 752 may include a third portion 7523 and a fourth portion 7524 which protrude upwards and downwards from the connecting portion of the first portion 7521 and the second portion 7522 in a specific length. Hence, the first divided opening 7121 may have the first parasitic resonance frequency F1, and the second divided opening 7122 may have the second parasitic resonance frequency F2. According to an embodiment, the parasitic resonance frequencies F1 and F2 may change their operating frequency according to a change of the protrusion and the shape of the third portion 7523 and/or the fourth portion 7524.

Figure 7C:
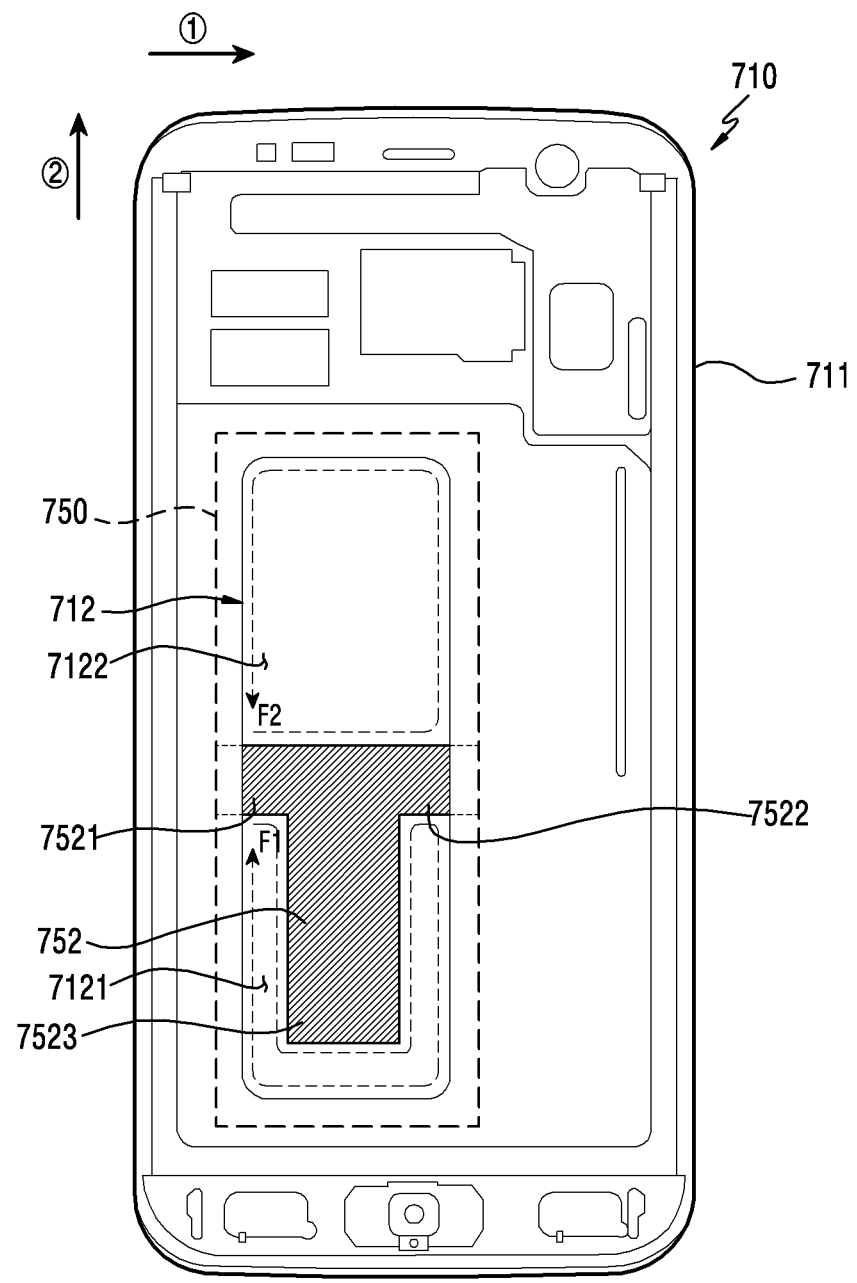

FIG. 7C excludes the fourth portion 7524 of the conductive member 752 of FIG. 7B, wherein the electrical length of the first divided opening 7121 is longer than the electrical length of the second divided opening 7122 and thus the first parasitic resonance frequency F1 may operate in a relatively lower frequency than the second parasitic resonance frequency F2.

Figure 7D:
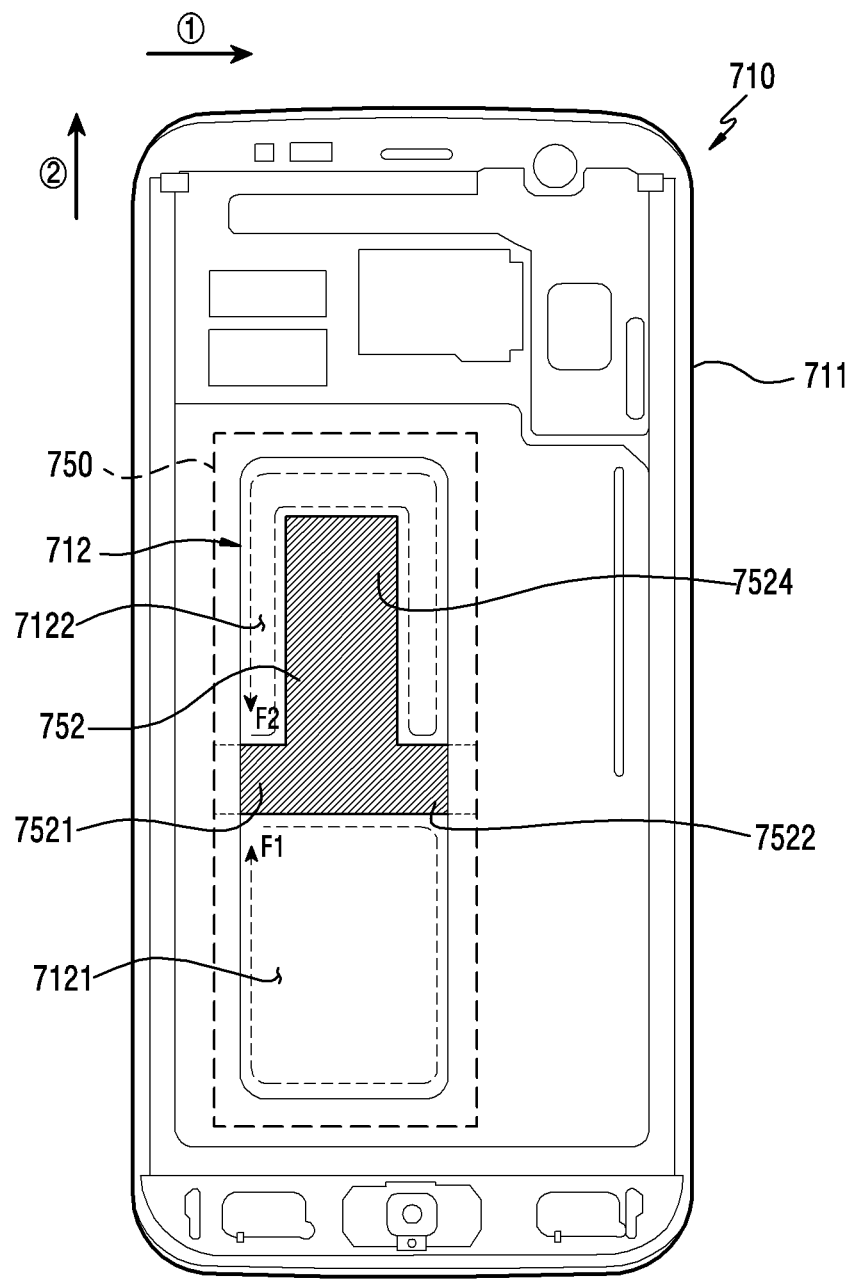

FIG. 7D excludes the third portion 7523 of the conductive member 752 of FIG. 7B, wherein the electrical length of the first divided opening 7121 is shorter than the electrical length of the second divided opening 7122 and thus the first parasitic resonance frequency F1 may operate in a relatively higher frequency than the second parasitic resonance frequency F2.

Figure 7E:
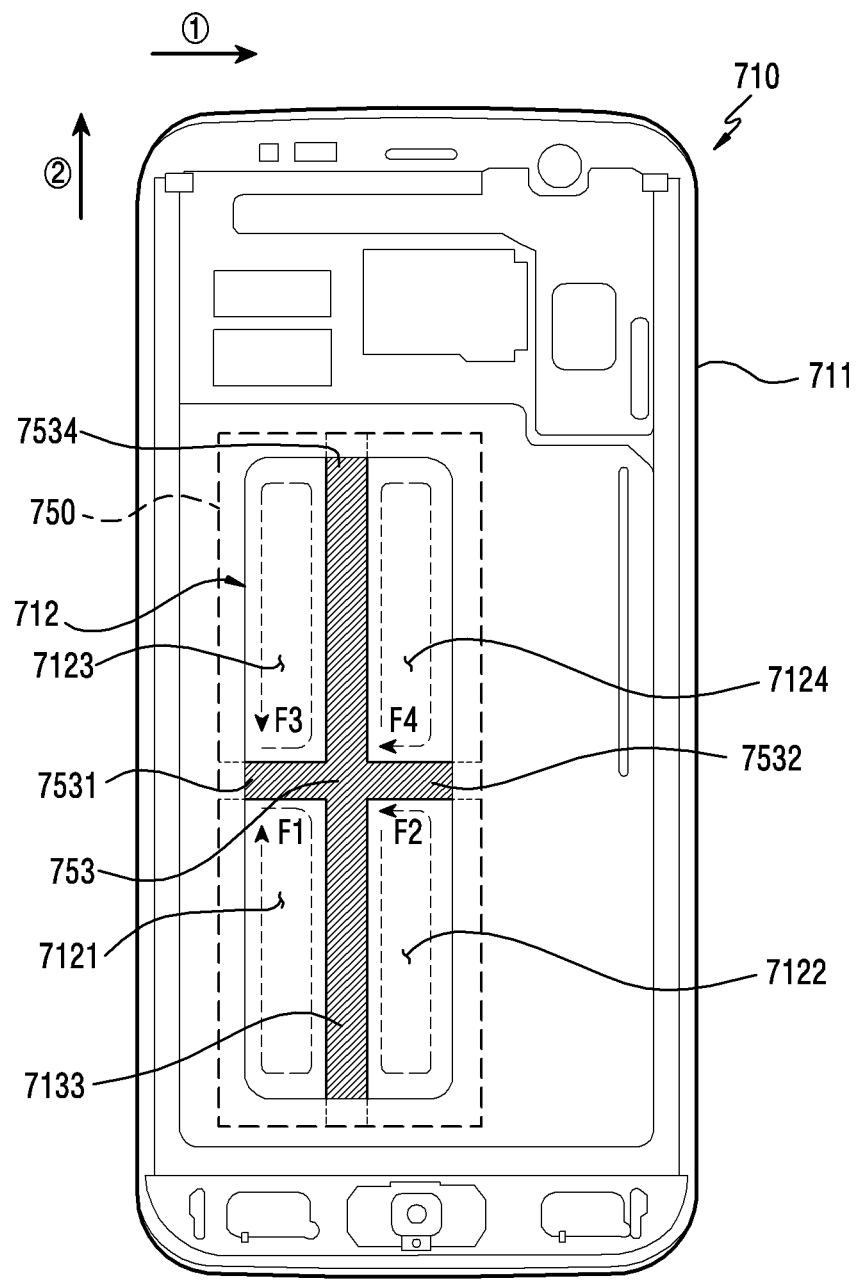

Referring to FIG. 7E, the opening 712 may be divided by a conductive member 753 disposed in the battery 750, into four divided openings 7121, 7122, 7123 and 7124. According to an embodiment, the conductive member 752 may divide the opening 712 to the four divided openings by crossing the transversal direction (e.g., the direction ①) of the opening 712 to electrically couple a first portion 7531 and a second portion 7532 to the conductive bracket 710 and by crossing the longitudinal direction (e.g., the direction ②) of the opening 712 to electrically couple the third portion 7533 and the fourth portion 7543 to the conductive bracket 710. Hence, the first divided opening 7121 may have the first parasitic resonance frequency F1, the second divided opening 7122 may have the second parasitic resonance frequency F2, the third divided opening 7123 may have a third parasitic resonance frequency F3, and the fourth divided opening 7124 may have a fourth parasitic resonance frequency F4.

Figure 7F:
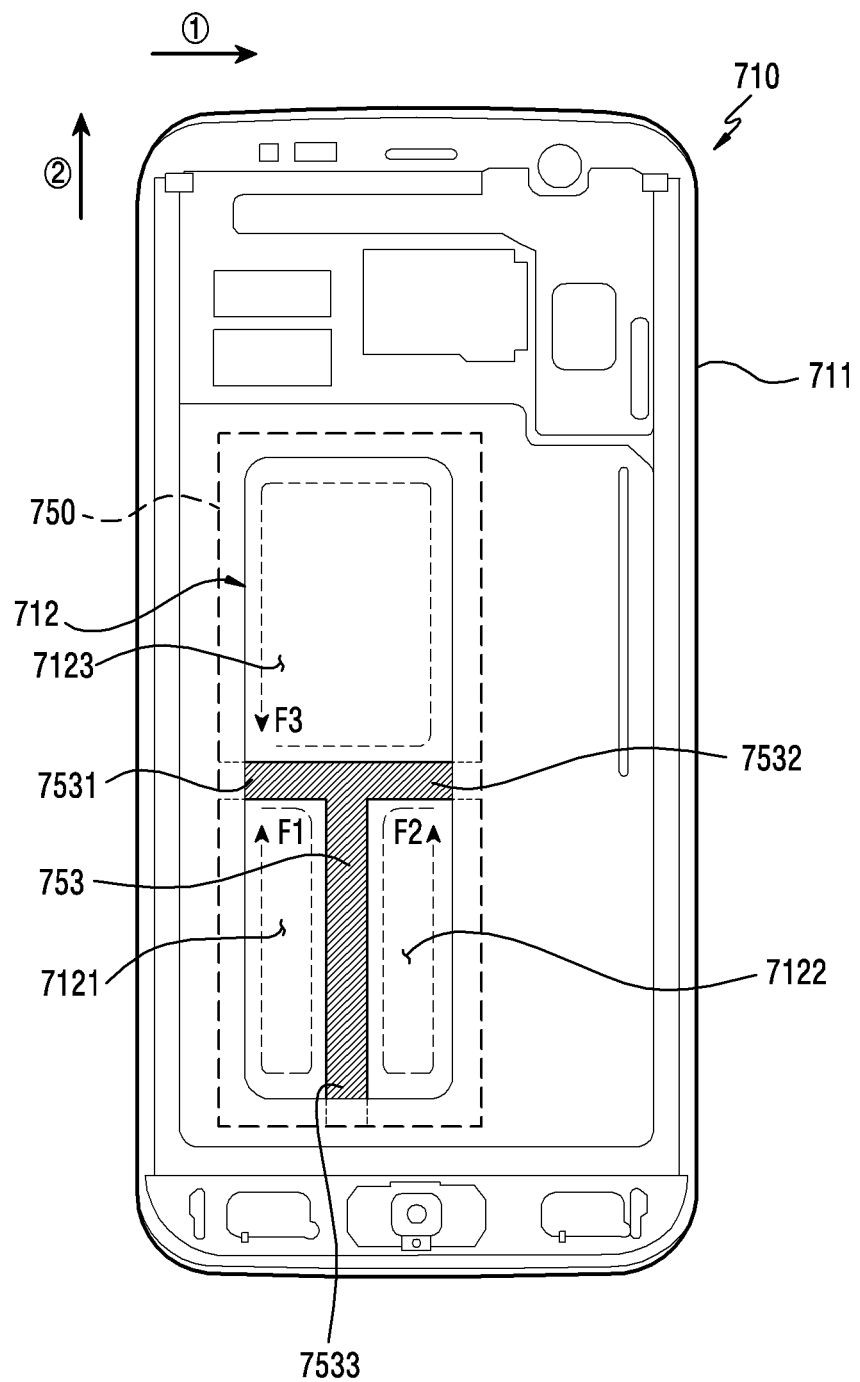

Referring to FIG. 7F, the fourth portion 7534 of the conductive member 753 of FIG. 7E is excluded, wherein the electrical length of the first divided opening 7121 and the second divided opening 7122 is relatively shorter than the electrical length of the third divided opening 7123 and accordingly the first parasitic resonance frequency F1 and the second parasitic resonance frequency F2 may operate in a relatively higher frequency than the third parasitic resonance frequency F3.

Figure 7G:
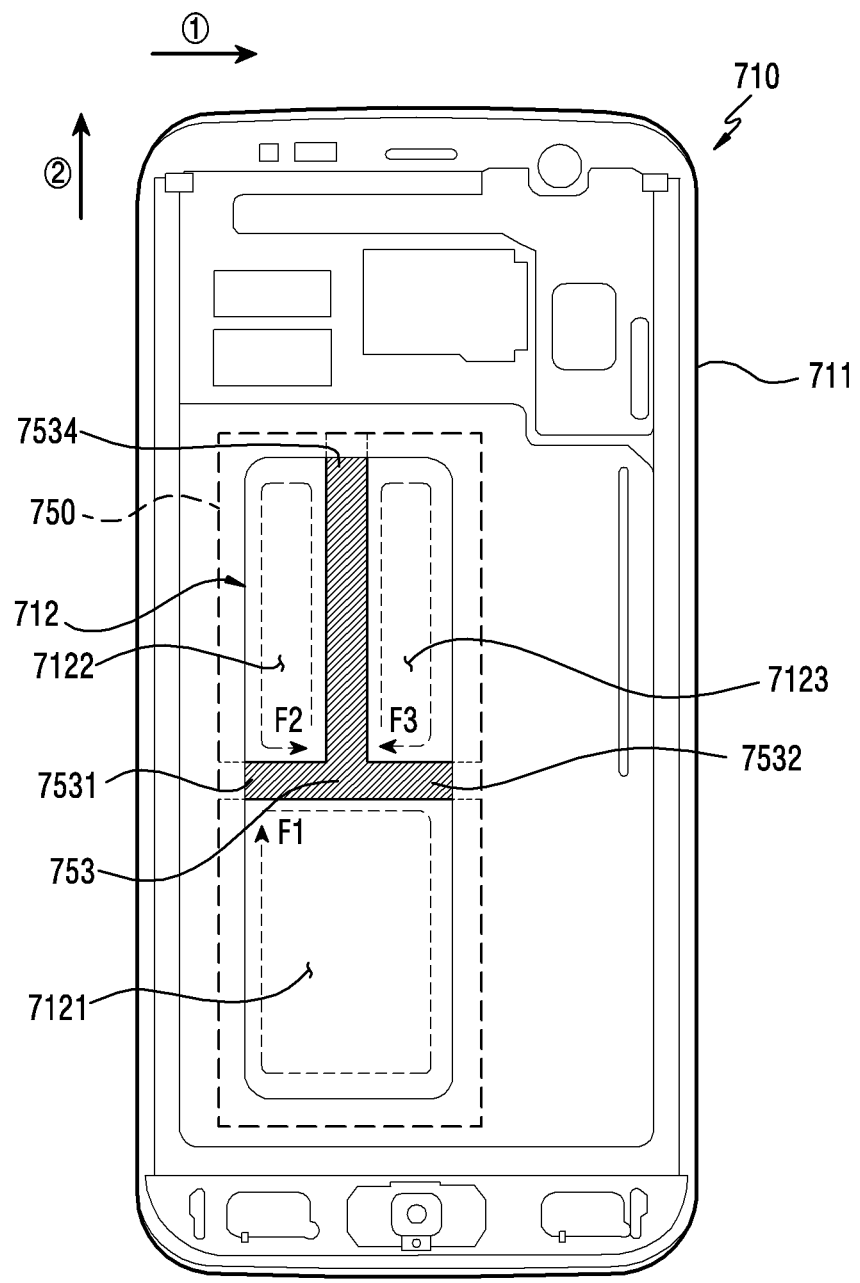

Referring to FIG. 7G, the third portion 7533 of the conductive member 753 of FIG. 7E is excluded, wherein the electrical length of the first divided opening 7121 is relatively longer than the electrical length of the second divided opening 7122 and the third divided opening 7123 and accordingly the first parasitic resonance frequency F1 may operate in a relatively lower frequency than the second parasitic resonance frequency F2 and the third parasitic resonance frequency F3.

Figure 7H:
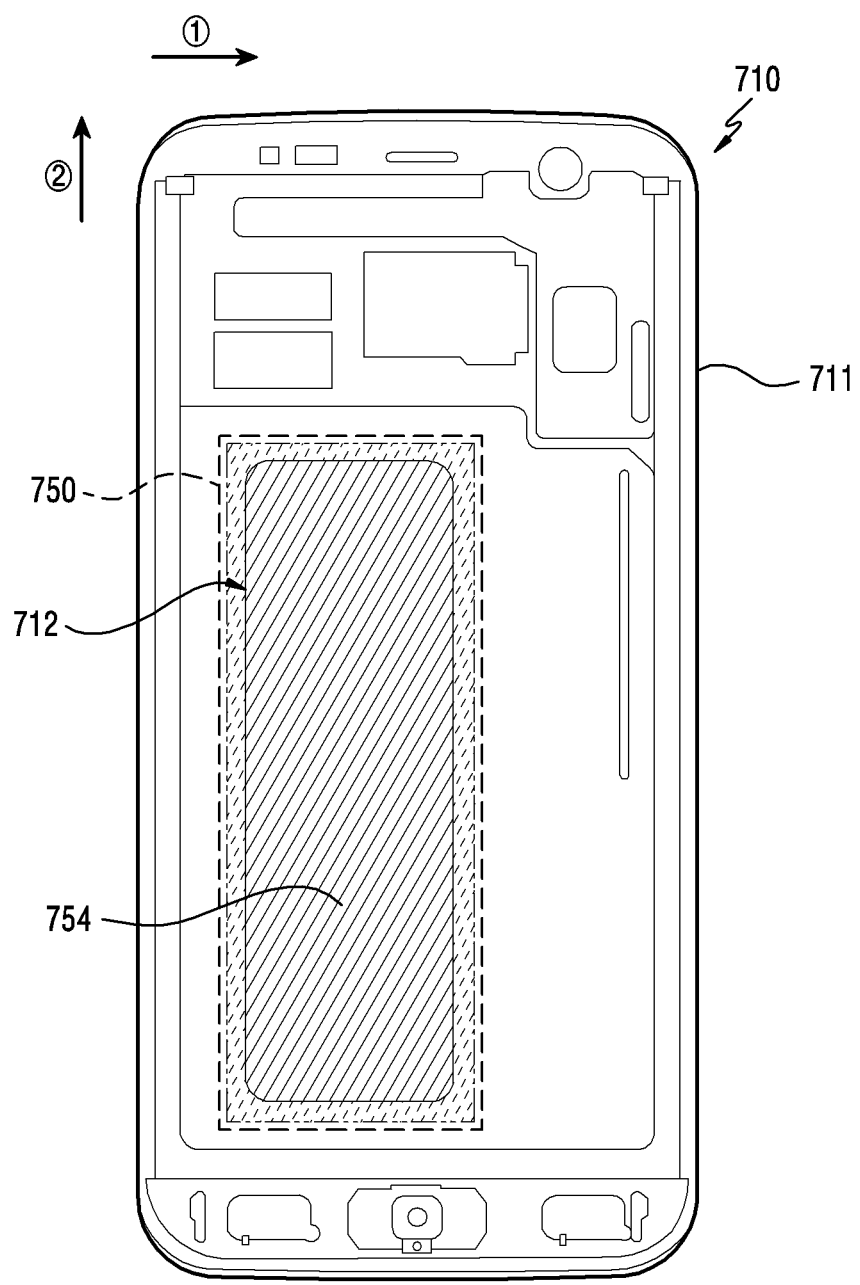

Referring to FIG. 7H, the opening 712 may be shielded by a conductive member 754 disposed in the battery 750. According to an embodiment, the conductive member 754 may be disposed not to electrically contact the conductive bracket 710, and may block the parasitic resonance by shielding all or at least part of the opening 712.

Figure 8:
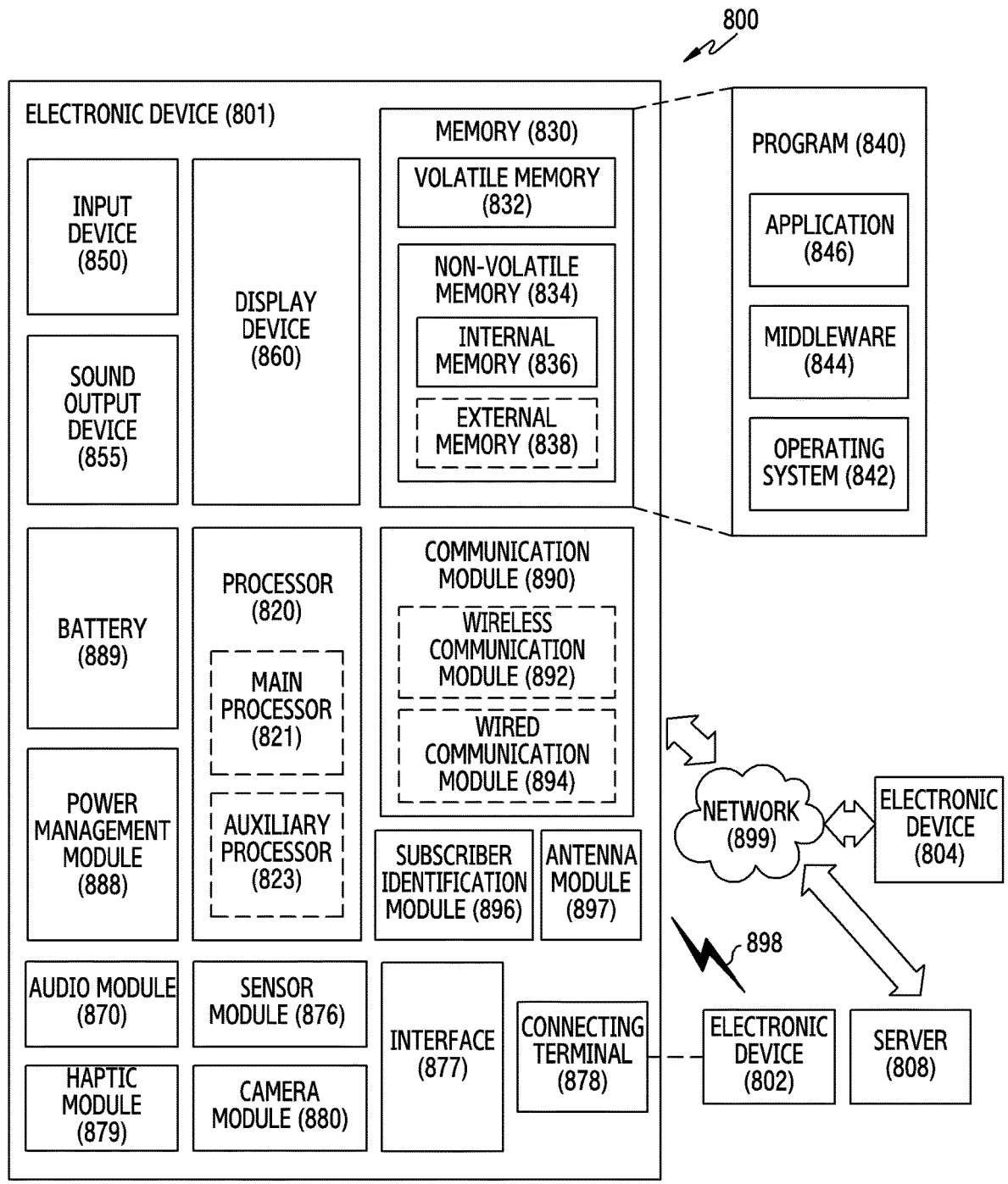
FIG. 8 is a block diagram illustrating an example electronic device in a network environment according to various embodiments of the present disclosure.

FIG. 8 is a block diagram illustrating an example electronic device 801 in a network environment 800 according to various embodiments. Referring to FIG. 8, the electronic device 801 in the network environment 800 may communicate with an electronic device 802 via a first network 898 (e.g., a short-range wireless communication network), or an electronic device 804 or a server 808 via a second network 899 (e.g., a long-range wireless communication network). According to an embodiment, the electronic device 801 may communicate with the electronic device 804 via the server 808. According to an embodiment, the electronic device 801 may include a processor 820, memory 830, an input device 850, a sound output device 855, a display device 860, an audio module 870, a sensor module 876, an interface 877, a haptic module 879, a camera module 880, a power management module 888, a battery 889, a communication module 890, a subscriber identification module (SIM) 896, or an antenna module 897. In some embodiments, at least one (e.g., the display device 860 or the camera module 880) of the components may be omitted from the electronic device 801, or one or more other components may be added in the electronic device 801. In some embodiments, some of the components may be implemented as single integrated circuitry. For example, the sensor module 876 (e.g., a fingerprint sensor, an iris sensor, or an illuminance sensor) may be implemented as embedded in the display device 860 (e.g., a display).

The processor 820 may execute, for example, software (e.g., a program 840) to control at least one other component (e.g., a hardware or software component) of the electronic device 801 coupled with the processor 820 and may perform various data processing or computation. According to one embodiment, as at least part of the data processing or computation, the processor 820 may load a command or data received from another component (e.g., the sensor module 876 or the communication module 890) in volatile memory 832, process the command or the data stored in the volatile memory 832, and store resulting data in non-volatile memory 834. According to an embodiment, the processor 820 may include a main processor 821 (e.g., a central processing unit (CPU) or an application processor (AP)), and an auxiliary processor 823 (e.g., a graphics processing unit (GPU), an image signal processor (ISP), a sensor hub processor, or a communication processor (CP)) that is operable independently from, or in conjunction with, the main processor 821. Additionally or alternatively, the auxiliary processor 823 may be adapted to consume less power than the main processor 821, or to be specific to a specified function. The auxiliary processor 823 may be implemented as separate from, or as part of the main processor 821.

The auxiliary processor 823 may control at least some of functions or states related to at least one component (e.g., the display device 860, the sensor module 876, or the communication module 890) among the components of the electronic device 801, instead of the main processor 821 while the main processor 821 is in an inactive (e.g., sleep) state, or together with the main processor 821 while the main processor 821 is in an active state (e.g., executing an application). According to an embodiment, the auxiliary processor 823 (e.g., an image signal processor or a communication processor) may be implemented as part of another component (e.g., the camera module 880 or the communication module 890) functionally related to the auxiliary processor 823.

The memory 830 may store various data used by at least one component (e.g., the processor 820 or the sensor module 876) of the electronic device 801. The various data may include, for example, software (e.g., the program 840) and input data or output data for a command related thereto. The memory 830 may include the volatile memory 832 or the non-volatile memory 834.

The program 840 may be stored in the memory 830 as software, and may include, for example, an operating system (OS) 842, middleware 844, or an application 846.

The input device 850 may receive a command or data to be used by other component (e.g., the processor 820) of the electronic device 801, from the outside (e.g., a user) of the electronic device 801. The input device 850 may include, for example, a microphone, a mouse, or a keyboard.

The sound output device 855 may output sound signals to the outside of the electronic device 801. The sound output device 855 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 860 may visually provide information to the outside (e.g., a user) of the electronic device 801. The display device 860 may include, for example, a display, a hologram device, or a projector and control circuitry to control a corresponding one of the display, hologram device, and projector. According to an embodiment, the display device 860 may include touch circuitry adapted to detect a touch, or sensor circuitry (e.g., a pressure sensor) adapted to measure the intensity of force incurred by the touch.

The audio module 870 may convert a sound into an electrical signal and vice versa. According to an embodiment, the audio module 870 may obtain the sound via the input device 850, or output the sound via the sound output device 855 or a headphone of an external electronic device (e.g., an electronic device 802) directly (e.g., wiredly) or wirelessly coupled with the electronic device 801.

The sensor module 876 may detect an operational state (e.g., power or temperature) of the electronic device 801 or an environmental state (e.g., a state of a user) external to the electronic device 801, and then generate an electrical signal or data value corresponding to the detected state. According to an embodiment, the sensor module 876 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 877 may support one or more specified protocols to be used for the electronic device 801 to be coupled with the external electronic device (e.g., the electronic device 802) directly (e.g., wiredly) or wirelessly. According to an embodiment, the interface 877 may include, for example, a high definition multimedia interface (HDMI), a universal serial bus (USB) interface, a secure digital (SD) card interface, or an audio interface.

A connecting terminal 878 may include a connector via which the electronic device 801 may be physically connected with the external electronic device (e.g., the electronic device 802). According to an embodiment, the connecting terminal 878 may include, for example, a HDMI connector, a USB connector, a SD card connector, or an audio connector (e.g., a headphone connector), The haptic module 879 may convert an electrical signal into a mechanical stimulus (e.g., a vibration or a movement) or electrical stimulus which may be recognized by a user via his tactile sensation or kinesthetic sensation. According to an embodiment, the haptic module 879 may include, for example, a motor, a piezoelectric element, or an electric stimulator.

The camera module 880 may capture a still image or moving images. According to an embodiment, the camera module 880 may include one or more lenses, image sensors, image signal processors, or flashes.

The power management module 888 may manage power supplied to the electronic device 801. According to one embodiment, the power management module 888 may be implemented as at least part of, for example, a power management integrated circuit (PMIC).

The battery 889 may supply power to at least one component of the electronic device 801. According to an embodiment, the battery 889 may include, for example, a primary cell which is not rechargeable, a secondary cell which is rechargeable, or a fuel cell.

The communication module 890 may support establishing a direct (e.g., wired) communication channel or a wireless communication channel between the electronic device 801 and the external electronic device (e.g., the electronic device 802, the electronic device 804, or the server 808) and performing communication via the established communication channel. The communication module 890 may include one or more communication processors that are operable independently from the processor 820 (e.g., the application processor (AP)) and supports a direct (e.g., wired) communication or a wireless communication. According to an embodiment, the communication module 890 may include a wireless communication module 892 (e.g., a cellular communication module, a short-range wireless communication module, or a global navigation satellite system (GNSS) communication module) or a wired communication module 894 (e.g., a local area network (LAN) communication module or a power line communication (PLC) module). A corresponding one of these communication modules may communicate with the external electronic device via the first network 898 (e.g., a short-range communication network, such as Bluetooth™, wireless-fidelity (Wi-Fi) direct, or infrared data association (IrDA)) or the second network 899 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 892 may identify and authenticate the electronic device 801 in a communication network, such as the first network 898 or the second network 899, using subscriber information (e.g., international mobile subscriber identity (IMSI)) stored in the subscriber identification module 896.

The antenna module 897 may transmit or receive a signal or power to or from the outside (e.g., the external electronic device) of the electronic device 801. According to an embodiment, the antenna module 897 may include one or more antennas, and, therefrom, at least one antenna appropriate for a communication scheme used in the communication network, such as the first network 898 or the second network 899, may be selected, for example, by the communication module 890 (e.g., the wireless communication module 892). The signal or the power may then be transmitted and/or received between the communication module 890 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 801 and the external electronic device 804 via the server 808 coupled with the second network 899. Each of the electronic devices 802 and 804 may be a device of a same type as, or a different type, from the electronic device 801. According to an embodiment, all or some of operations to be executed at the electronic device 801 may be executed at one or more of the external electronic devices 802, 804, or 808. For example, if the electronic device 801 should perform a function or a service automatically, or in response to a request from a user or another device, the electronic device 801, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 801. The electronic device 801 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 840) including one or more instructions that are stored in a storage medium (e.g., internal memory 836 or external memory 838) that is readable by a machine (e.g., the electronic device 801). For example, a processor (e.g., the processor 820) of the machine (e.g., the electronic device 801) may invoke at least one of the one or more instructions stored in the storage medium, and execute it, with or without using one or more other components under the control of the processor. This allows the machine to be operated to perform at least one function according to the at least one instruction invoked. The one or more instructions may include a code made by a complier or a code executable by an interpreter. The machine-readable storage medium may be provided in the form of a non-transitory storage medium. Wherein, the term "non-transitory" simply means that the storage medium is a tangible device, but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments, an electronic device (e.g., the electronic device 300 of FIG. 4A) may include a conductive bracket (e.g., the conductive bracket 310 of FIG. 4A) including an opening (e.g., the opening 312 of FIG. 4A) in at least part of the bracket, a display (e.g., the display 330 of FIG. 4A) disposed on one surface of the bracket, a battery (e.g., the battery 350 of FIG. 4A) disposed on another surface of the bracket to face at least part of the opening, an antenna (e.g., the conductive portion 3104 of FIG. 4A) disposed within a specified range (e.g., a distance at which a parasitic resonance may be induced by the opening in the bracket) of the bracket and configured to output a signal of a first frequency band, and a conductive member (e.g., the conductive member 351 of FIG. 4A) comprising a conductive material and electrically coupled to the bracket by crossing at least part of the opening, wherein the opening is divided into a plurality of openings by the conductive member, to adjust resonance of a second frequency band of the opening generated by the signal outputted from the antenna.

According to various embodiments, the conductive member may be disposed between the bracket and the battery.

According to various embodiments, the opening may include at least two divided openings (e.g., the first divided opening 3121 and the second divided opening 3122 of FIG. 5A) defined by the conductive member electrically dividing the opening.

According to various embodiments, the conductive member may include at least one of: a conductive metal plate, conductive tape, conductive foam, and conductive paint, is the conductive member being attached to and/or disposed on an outer surface of the battery.

According to various embodiments, a conductive medium may be interposed between the battery and the bracket.

According to various embodiments, the conductive medium may include at least one of: conductive foam, conductive tape, and a conductive sealing member.

According to various embodiments, the opening may be divided by the conductive member into at least two divided openings, and the second frequency may be shifted to a band other than the first frequency through the divided openings.

According to various embodiments, a portable communication device (e.g., the portable communication device 300 of FIG. 3) may include a housing including a front plate (e.g., the front plate 320 of FIG. 3), a rear plate (e.g., the rear plate 380 of FIG. 3) which faces away from the front plate, and a side surface (e.g., the side member 311 of FIG. 3) which substantially surrounds a space between the front plate and the rear plate, at least one antenna (e.g., the conductive portion 3104 of FIG. 4A) disposed in at least part of the housing and/or the space, a display (e.g., the display 330 of FIG. 4A) exposed through at least part of the front plate, at least one wireless communication circuit (e.g., the wireless communication circuit 343 of FIG. 5A) electrically coupled to the antenna, a bracket (e.g., the conductive bracket 310 of FIG. 4A) including at least one opening (e.g., the opening 312 of FIG. 4A), the bracket being disposed in the space and extending from within a specified range of the antenna, at least one electronic part (e.g., the electronic part 350 of FIG. 4A) mounted in the at least one opening, a conductor (e.g., the conductor 333 of FIG. 4A) disposed from within a specified range of the antenna to within a specified range of the at least one opening, and at least one conductive member (e.g., the conductive member 351 of FIG. 4A) comprising a conductive material disposed in the at least one electronic part configured to divide the at least one opening to a plurality of portions, wherein the at least one electronic part is mounted in the at least one opening.

According to various embodiments, the wireless communication circuit may be configured to transmit and/or receive signals in a first frequency range via the antenna.

According to various embodiments, the at least one electronic part may include a battery, and the at least one conductive member may be disposed in the battery.

According to various embodiments, if the battery is mounted in the bracket, at least part of the at least one conductive member may be electrically coupled to the bracket.

According to various embodiments, if the rear plate is viewed from above, the at least one opening may be divided by the conductive member into a first divided opening and a second divided opening in sequence from the antenna, the first divided opening may have a first electrical length, and the second divided opening may have a second electrical length.

According to various embodiments, the at least one conductive member may be disposed at a position of the at least one opening where the first electrical length is within $\lambda/4$.

According to various embodiments, the at least one conductive member may be disposed at a position of the at least one opening where the second electrical length operates in a second frequency band which is different from the first frequency range.

According to various embodiments, the at least one conductive member may include at least one of: a conductive metal plate, conductive tape, conductive foam, and conductive paint, which is attached to or formed on an outer surface of the battery.

According to various embodiments, if the front plate is viewed from above, the antenna may be electrically disconnected between a first nonconductive member and a second nonconductive member which are spaced in at least part of the side member.

According to various embodiments, the conductor may extend from the display, and include a flexible printed circuit board (FPCB) extending from within a specified range of the antenna toward the opening and interposed between the display and the bracket.

According to various embodiments, the at least one electronic part may include at least one of: an electronic pen slot, a camera mounting hole, a sensor module hole, and wiring through holes, which are formed in at least part of the bracket.

According to various embodiments, the at least one conductive member may be disposed in the at least one electronic part, and if the at least one electronic part is mounted in the at least one opening, the at least one electronic part is electrically coupled to the bracket.

According to various embodiments, an electronic device (e.g., the electronic device 300 of FIG. 4A) may include a battery (e.g., the battery 350 of FIG. 4A), a conductive bracket (e.g., the bracket 310 of FIG. 4A) including an opening (e.g., the opening 312 of FIG. 4A) configured to accommodate swelling of the battery, in at least part of a portion where the battery is mounted, a display (e.g., the display 330 of FIG. 4A) disposed on a surface of the bracket, an antenna (e.g., the conductive portion 3104 of FIG. 4A) disposed within a specified range of the bracket and configured to output a signal of a first frequency band, and a conductive member (e.g., the conductive member 351 of FIG. 4A) comprising a conductive material disposed in at least part of the battery and configured to be electrically coupled to the bracket by crossing at least part of the opening, wherein the opening is divided into a plurality of openings to adjust parasitic resonance of a second frequency band from the opening generated by the signal output from the antenna.

According to various embodiments, even if at least one opening is disposed in the conductive bracket of the electronic device, the opening is divided in various sizes and shapes. Therefore, the parasitic resonance frequency may be shielded in the resonance frequency band of the antenna device or interference of the resonance frequency may be avoided, thus preventing the radiation performance degradation.

While the present disclosure has been illustrated and described with reference to various example embodiments thereof, it will be understood by those skilled in the art that various changes in form and details may be made therein without departing from the spirit and scope of the present disclosure as defined, for example, by the appended claims and their equivalents.

What is claimed is:

1. An electronic device comprising:
   a conductive bracket comprising an opening in at least part of the bracket;
   a display disposed on one surface of the bracket;
   a battery disposed on another surface of the bracket to face at least part of the opening;
   an antenna disposed within a specified range of the bracket and configured to output a signal of a first frequency band; and
   a conductive member comprising conductive material electrically coupled to the bracket by crossing at least part of the opening, wherein the opening is divided into a plurality of openings by the conductive member to adjust resonance of a second frequency band of the opening generated by the signal output from the antenna.

2. The electronic device of claim 1, wherein the conductive member is disposed between the bracket and the battery.

3. The electronic device of claim 2, wherein the opening includes at least two divided openings defined by the conductive member electrically dividing the opening.

4. The electronic device of claim 1, wherein the conductive member comprises at least one of: a conductive metal plate, conductive tape, conductive foam, and conductive paint, the conductive member being attached to and/or formed on an outer surface of the battery.

5. The electronic device of claim 1, wherein a conductive medium is interposed between the battery and the bracket.

6. The electronic device of claim 5, wherein the conductive medium comprises at least one of: conductive foam, conductive tape, and a conductive sealing member.

7. The electronic device of claim 1, wherein the opening is divided by the conductive member into at least two divided openings, and
   the second frequency is shifted to a band other than the first frequency band through the divided openings.

8. A portable communication device comprising:
   a housing comprising a front plate, a rear plate facing away from the front plate, and a side surface substantially surrounding a space between the front plate and the rear plate;
   at least one antenna disposed in at least part of the housing and/or the space;
   a display exposed through at least part of the front plate;
   at least one wireless communication circuit electrically coupled to the antenna;
   a bracket comprising at least one opening, the bracket being disposed in the space and extending from a specified range of the antenna;
   at least one electronic part mounted in the at least one opening;
   a conductor disposed to extend from within a specified range of the antenna to within a specified range of the at least one opening; and
   at least one conductive member comprising conductive material disposed in at least one electronic component mounted in the at least one opening, wherein the at least one opening is divided into a plurality of portions by the at least one conductive member.

9. The portable communication device of claim 8, wherein the wireless communication circuit is configured to transmit and/or receive signals in a first frequency range via the antenna.

10. The portable communication device of claim 8, wherein the at least one electronic part comprises a battery, and the at least one conductive member is disposed in the battery.

11. The portable communication device of claim 10, wherein, at least part of the at least one conductive member is electrically coupled to the bracket based on the battery being mounted in the bracket.

12. The portable communication device of claim 11, wherein, the at least one opening is divided by the conductive member into a first divided opening and a second divided opening in sequence from the antenna when viewed from above the rear plate,
   wherein the first divided opening has a first electrical length and the second divided opening has a second electrical length.

13. The portable communication device of claim 12, wherein the at least one conductive member is disposed at a position of the at least one opening where the first electrical length is within $\lambda/4$.

14. The portable communication device of claim 12, wherein the at least one conductive member is disposed at a position of the at least one opening where the second electrical length operates in a second frequency band different from the first frequency range.

15. The portable communication device of claim 10, wherein the at least one conductive member comprises at least one of: a conductive metal plate, conductive tape, conductive foam, and conductive paint, is the conductive member being attached to and/or formed on an outer surface of the battery.

16. The portable communication device of claim 8, wherein, the antenna is electrically disconnected between a first nonconductive member and a second nonconductive member which are spaced in at least part of the side member when viewed from above the front plate.

17. The portable communication device of claim 8, wherein the conductor extends from the display and comprises a flexible printed circuit board (FPCB) extending from within a specified range of the antenna toward the opening and is interposed between the display and the bracket.

18. The portable communication device of claim 8, wherein the at least one electronic part comprises at least one of: an electronic pen slot, a camera mounting hole, a sensor module hole, and wiring through holes, the electronic part being formed in at least part of the bracket.

19. The portable communication device of claim 18, wherein the at least one conductive member is disposed in the at least one electronic part, and
   the at least one electronic part is electrically coupled to the bracket based on the at least one electronic part being mounted in the at least one opening.

20. An electronic device comprising:
   a battery;
   a conductive bracket having comprising an opening configured to accommodate swelling of the battery in at least part of a portion of the electronic device where the battery is mounted;
   a display disposed on a surface of the bracket;
   an antenna disposed within a specified range of the bracket and configured to output a signal of a first frequency band; and
   a conductive member comprising conductive material disposed in at least part of the battery and electrically coupled to the bracket by crossing at least part of the opening, wherein the opening is divided into a plurality of openings, to adjust parasitic resonance of a second frequency band from the opening generated by the signal output from the antenna.

* * * * *